United States Patent
Matsumoto et al.

(10) Patent No.: US 6,446,043 B1
(45) Date of Patent: Sep. 3, 2002

(54) COMMUNICATION PARAMETER SEARCH APPARATUS AND COMMUNICATION SUPPORT APPARATUS USING THE SAME

(75) Inventors: Yasuhide Matsumoto, Akashi; Satoshi Okuyama, Kobe; Sumiyo Okada; Noriyuki Fukuyama, both of Akashi; Ai Manabe, Hyogo, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/994,997

(22) Filed: Dec. 19, 1997

(30) Foreign Application Priority Data

Jul. 28, 1997 (JP) .............................................. 9-201558

(51) Int. Cl.[7] .............................................. G06F 17/60
(52) U.S. Cl. ............................. 705/8; 705/9; 379/201.1; 379/201.04
(58) Field of Search .............................. 705/8, 9, 32, 1; 345/963; 395/672, 673, 557, 200.3; 702/178; 707/8; 379/211, 157, 156, 217, 212, 214, 201

(56) References Cited

U.S. PATENT DOCUMENTS

| | | | | |
|---|---|---|---|---|
| 4,752,951 A | * | 6/1988 | Konneker .................... 379/211 |
| 5,111,391 A | * | 5/1992 | Fields et al. .................... 705/9 |
| 5,124,912 A | * | 6/1992 | Hotaling et al. ................ 705/9 |
| 5,197,000 A | * | 3/1993 | Vincent .......................... 705/8 |
| 5,303,145 A | * | 4/1994 | Griffin et al. ................... 705/9 |
| 5,414,759 A | * | 5/1995 | Ishikuri et al. .............. 379/211 |
| 5,428,678 A | * | 6/1995 | Fitzpatrick et al. .......... 345/963 |
| 5,493,692 A | * | 2/1996 | Theimer et al. ............ 455/26.1 |
| 5,515,426 A | * | 5/1996 | Yacenda et al. ............. 379/201 |
| 5,659,596 A | * | 8/1997 | Dunn .......................... 455/456 |
| 5,774,867 A | * | 6/1998 | Fitzpatrick et al. ............. 705/8 |
| 5,864,670 A | * | 1/1999 | Hayashi et al. .......... 395/200.3 |
| 5,867,822 A | * | 2/1999 | Sankar .......................... 705/8 |
| 5,899,979 A | * | 5/1999 | Miller et al. .................... 705/9 |
| 5,920,858 A | * | 7/1999 | Kitabayashi et al. ........... 707/4 |
| 5,930,471 A | * | 7/1999 | Milewski et al. ............ 709/204 |
| 5,930,700 A | * | 7/1999 | Pepper et al. ................ 379/211 |
| 5,930,702 A | * | 7/1999 | Goldman et al. ........... 379/211 |
| 5,963,913 A | * | 10/1999 | Henneuse et al. ............. 705/9 |
| 6,016,478 A | * | 1/2000 | Zhang et al. ................... 705/9 |
| 6,026,153 A | * | 2/2000 | Fuller et al. ................. 379/211 |

FOREIGN PATENT DOCUMENTS

| | | | |
|---|---|---|---|
| EP | 0 448 076 A2 | * 9/1991 | ............ H04M/3/42 |
| EP | 0 781 067 A2 | * 12/1995 | ............ H04Q/9/00 |

OTHER PUBLICATIONS

Xenakis, John J., "Keeping Track of Employees", CFO, vol. 12, Issue 2, p. 16, Feb. 1996.*
Schwartz, Jeffrey, "Effort Targets Calendaring on the Web", Communications Week, Issue 620, p. 1, 2 pages, Jul. 22, 1996.*
Emmerson et al, "Mind Your Language", Communications International, vol. 24, No. 5, pp. 8–12, May 1997.*

* cited by examiner

Primary Examiner—James P. Trammell
Assistant Examiner—John W. Hayes
(74) Attorney, Agent, or Firm—Staas & Halsey LLP

(57) ABSTRACT

A communication parameter search apparatus includes a location managing part for receiving a signal indicating a location of each user, and for managing the location of each user, an input receiving part for receiving an input designating a location from an operator, a communication parameter storing module for storing communication parameters necessary for communication with each user, a user search module for referring to information managed by the location managing part and for searching for users present in the location designated by the input received by the input receiving part, and a communication parameter search module for searching the communication parameter storing module for communication parameters concerning the users searched for by the user search module.

36 Claims, 29 Drawing Sheets

| Directory Name | Location |
|---|---|
| Makoto Sato | Meeting Room A |
| Taro Yamada, Juzo Itagaki | Library |
| ⋅<br>⋅<br>⋅ | ⋅<br>⋅<br>⋅ |

| Sensor ID | Location |
|---|---|
| 1 | Library |
| 2 | Meeting Room A |
| ⋅<br>⋅<br>⋅ | ⋅<br>⋅<br>⋅ |

FIG. 6

| 961023 14:00 | 961023 14:10 | 961023 14:20 | 961023 14:30 | 961023 14:40 | 961023 14:50 |
|---|---|---|---|---|---| iii

| Directory Name | Location |
|---|---|
| Makoto Sato | Meeting Room A |
| Taro Yamada, Juzo Itagaki | Library |
| . . . | . . . |

FIG. 8

| Directory Name | Mail Address | Telephone Number | Facsimile Number | · | · |
|---|---|---|---|---|---|
| Makoto Sato | sato@xx.xx.xx | 000-000-0000 | 000-000-0000 | · | · |
| Taro Yamada | Yama@xx.xx.xx | 000-000-0000 | 000-000-0000 | · | · |
| · · · | · · · | · · · | · · · | · · · | · · · |

FIG. 10

| Planner | Start Time | End Time | Topic | Location | Participants |
|---------|------------|----------|-------|----------|--------------|
| Makoto Sato | 961023 13:00 | 961023 15:00 | Project-A Meeting | Meeting Room A | Hideo Maruyama |
| Taro Yamada | 961023 13:00 | 961023 15:00 | | Library | |
| ... | ... | ... | ... | ... | ... |

FIG. 16(a)

| TIME DESIGNATION | : 961023 14:00 ~14:30 |
|---|---|
| LOCATION | : MEETING ROOM A |

FIG. 16(c)

| DIRECTORY NAME | APPEARANCE TIMES | STAY PERIOD |
|---|---|---|
| MAKOTO SATO | 3 | 00:30:00 |
| JUNICHI INOUE | 3 | 00:30:00 |
| KOICHI KATO | 2 | 00:20:00 |

FIG. 16(b)

| 961023 14:00 | 961023 14:10 | 961023 14:20 | 961023 14:30 | 961023 14:40 | 961023 14:50 | ⋮ |

| 961023 14:00 | | 961023 14:10 | | 961023 14:20 | |
|---|---|---|---|---|---|
| LOCATION | DIRECTORY NAME | LOCATION | DIRECTORY NAME | LOCATION | DIRECTORY NAME |
| MEETING ROOM A | MAKOTO SATO JUNICHI INOUE KOICHI KATO | MEETING ROOM A | MAKOTO SATO JUNICHI INOUE KOICHI KATO | MEETING ROOM A | MAKOTO SATO JUNICHI INOUE KOICHI KATO |
| LIBRARY | TARO YAMADA JUZO ITAGAKI | LIBRARY | TARO YAMADA JUZO ITAGAKI | LIBRARY | TARO YAMADA JUZO ITAGAKI |
| ... | ... | ... | ... | ... | ... |

FIG. 20

| 421c | 421a | 421b |

- LOC: MEETING ROOM A
- START TIME
  - TIME ☐ : ☐ : ☐
  - DATE ☐ / ☐ / ☐
- END TIME
  - TIME ☐ : ☐ : ☐
  - DATE ☐ / ☐ / ☐

OPTION
- ☒ MINIMUM STAY PERIOD      ☐ : ☐ : ☐
- ☒ ATTRIBUTE PARAMETER     ○○ SALES OFFICE
- ☐ COMMUNICATION START TIME    ☐ / ☐ / ☐  ☐ : ☐ : ☐
- ☐ CONFIRM?

MAIL BODY

[ OK ]  [ CANCEL ]

COMMUNICATION PARAMETER SEARCH APPARATUS AND COMMUNICATION SUPPORT APPARATUS USING THE SAME

FIELD OF THE INVENTION

The present invention relates to a communication parameter search apparatus for searching information necessary for communication such as a telephone number, a mail address, a facsimile number or the like hereinafter, referred to as "a communication parameter") and a communication support apparatus using the same.

BACKGROUND OF THE INVENTION

In recent years, a schedule management system has been put to practical use. In the schedule management system, a schedule of each user is electronically managed, so that, for example, an electronic mail can be simultaneously transmitted to users who are due to participate in a meeting (e.g., Schedule+(trade name) manufactured by Microsoft Corporation).

Another system has been invented which not only manages a schedule of each user so as to support scheduling for a meeting or the like, but also manages the location of each user in real time and stores a method for contact corresponding to each location. Thus, it is determined whether or not it is possible to contact each user. In the case where it is possible to contact a user, the system displays the method for contact. In addition to such a function, for example, a system disclosed in Japanese Laid-Open Patent Publication No. 6-274495 can inform reachable participants shortly before the start time, that the start time of a scheduled meeting is approaching.

However, the aforementioned conventional system is unable to transmit proceedings to users who participated in a meeting after the meeting. In order to transmit the proceedings, it is necessary to look into other sources for the communication parameter of all the participants and communicate in an ordinary process. More specifically, in order to transmit a mail, as shown in FIG. 30, it is necessary to input a mail address of each participant on a screen.

Therefore, in the case where, for example, a large number of participants are present in a meeting, the conventional system has a problem in that troublesome tasks are required for contacting the participants after the meeting.

SUMMARY OF THE INVENTION

A communication parameter search apparatus according to the present invention includes location managing means for receiving a signal indicating a location of each user and for managing the location of each user, input receiving means for receiving an input designating a location from an operator, communication parameter storing means for storing communication parameters necessary for communication with each user, user search means for referring to information managed by the location managing means and for searching for users present in the location designated by the input received by the input receiving means, and communication parameter search means for searching the communication parameter storing means for communication parameters concerning the users searched for by the user search means.

In one embodiment of this invention, the location managing means further includes location history information storing means for storing history of location information representing a location of each managed user. The input receiving means further receives an input of a range of time from an operator. The user search means refers to information stored in the location history information storing means so as to search for users present in the location designated by the input received by the input receiving means in the designated range of time.

In another embodiment of this invention, the communication parameter search apparatus further includes schedule input receiving means for receiving an input of a schedule from each user, and schedule storing means for storing a schedule received by the schedule input receiving means. If a range of time designated by an input received by the input receiving means includes a time after the time of reception of the input, the user search means refers to the schedule so as to search for users present in a location designated by the input received by the input receiving means in the designated range of time.

In still another embodiment of this invention, the input receiving means further receives an input of a minimum stay period of users to be searched for from an operator. The user search means further includes a stay period calculating means for calculating stay period of searched users, referring to at least one of the location history information storing means and the schedule storing means. The communication parameter search means searches for communication parameters concerning users whose stay period calculated by the stay period calculating means is longer than the minimum stay period received by the input receiving means.

In one embodiment of this invention, a communication support apparatus includes the communication parameter search apparatus according to one embodiment of this invention and communication control means for performing communication using a communication parameter searched for by the communication parameter search apparatus.

In one embodiment of this invention, the communication support apparatus further includes display means for displaying an addressee searched for by the communication parameter search apparatus, correction input receiving means for receiving an input of correction concerning the addressee from an operator, and correction means for correcting a communication parameter based on the input received by the correction input receiving means. The communication control means performs communication using the communication parameter corrected by the correction means.

In another embodiment of the communication parameter search apparatus of this invention, the input receiving means further receives an input designating an attribute value of users to be searched for. The communication parameter storing means further stores the attribute value of each user. The communication parameter search means searches for a communication parameters concerning users having the attribute value designated by the input.

In yet another embodiment of the communication parameter search apparatus of this invention, the input receiving means further receives an input of a minimum stay period of users to be searched for from an operator, the user search means further includes stay period calculating means for calculating stay period of searched users, referring to at least one of the location history information storing means and the schedule storing means. The communication parameter search means searches for communication parameters concerning users whose stay period calculated by the stay period calculating means is longer than the minimum stay period received by the input receiving means.

Thus, the invention described herein makes possible the advantages of (1) providing a communication parameter search apparatus capable of easily specifying users to communicate with and searching for communication parameters of the users to communicate with and (2) providing a communication support apparatus using the same.

These and other advantages of the present invention will become apparent to those skilled in the art upon reading and understanding the following detailed description with reference to the accompanying figures.

BRIEF DESCRIPTION OF THE DRAWINGS

FIG. 6 is a view showing an exemplary data structure of location history information.

FIG. 8 is a view showing an exemplary data structure of directory information.

FIG. 10 is a view showing an exemplary data structure of schedule information.

FIG. 16 is a view for illustrating a process of getting directory names.

FIG. 20 is a view showing an exemplary display screen for inputting search keys.

DETAILED DESCRIPTION OF THE INVENTION

Hereinafter, the present invention will be described by way of examples with reference to the accompanying drawings.

Figure 1:
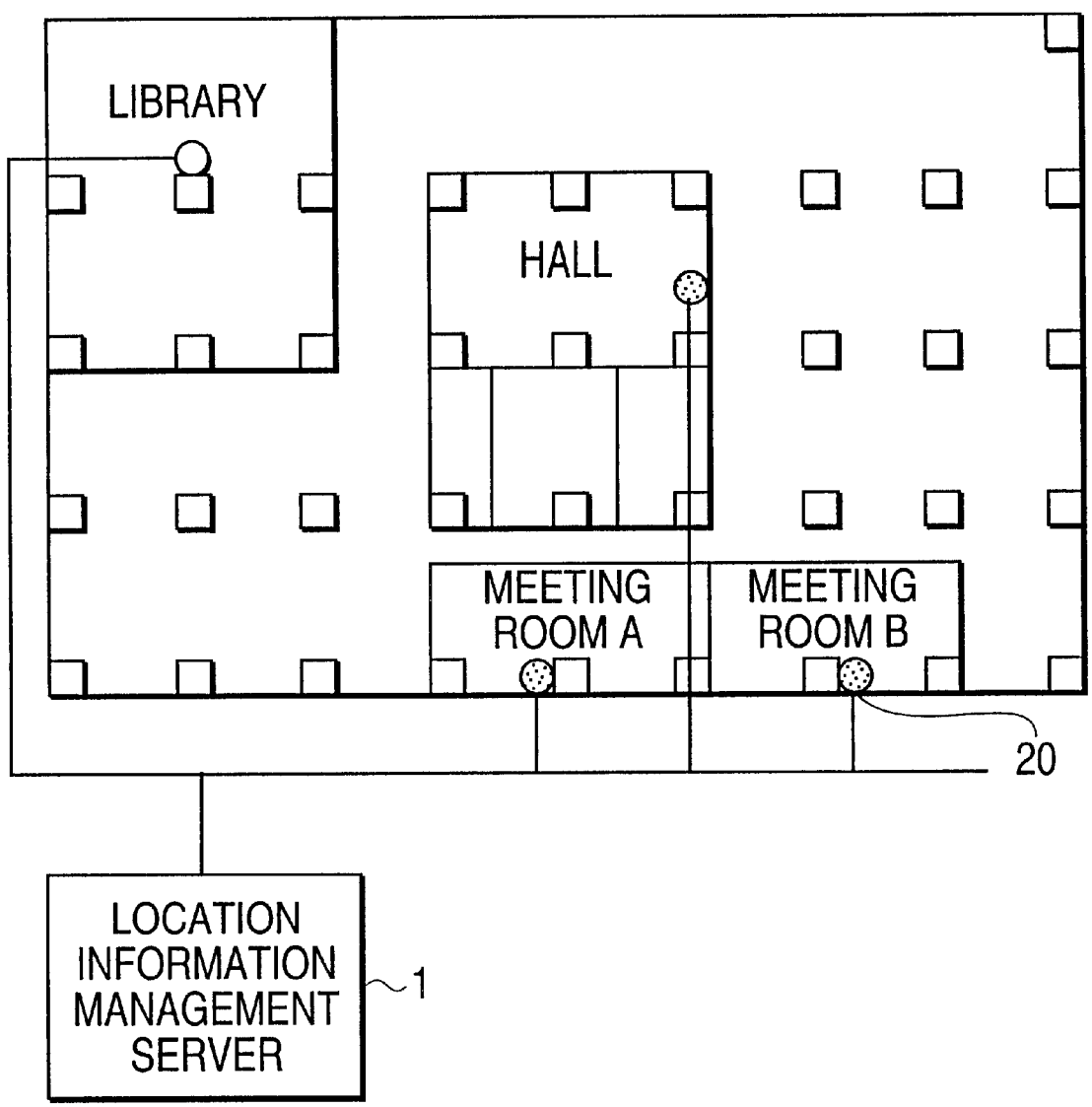
FIG. 1 is a view for illustrating an environment where a communication parameter search apparatus and a communication support apparatus using the same are implemented, according to one embodiment of the present invention.

FIG. 1 is a view for illustrating an outline of a communication parameter search apparatus and a communication support apparatus using such an apparatus according to a first embodiment of the present invention.

In FIG. 1, reference numeral 1 denotes a location information management server, and reference numeral 20 denotes a sensor. In the communication parameter search apparatus of the present embodiment, the sensor 20 is provided in each location, as shown in FIG. 1. Thus, each user should constantly wear an ID badge or the like, which can be detected by the sensors. A specific example of the ID badge is "Active Badge" (trade name) manufactured by Olivetti S.p.A. However, means for detecting the location of each user is not limited to the sensor and the ID badge. For example, a cellular phone, a PHS, or a combination of a radio LAN and a portable personal computer or the like can be used.

Each sensor detects an ID badge which can be detected within the coverage of the sensor at a predetermined interval of time, and transmits the identification of the detected badge to the location information management server 1. Since the location information management server 1 manages which sensor has detected the identification of a specific badge, it is possible to determine where each user is located by referring to the correspondence of the identification of the badge and the user and the correspondence of the sensor and the location thereof. According to the present invention, with such a structure, it is possible to extract users present in the same location in a certain time by getting location history information (described later) of each user over time so as to perform necessary communication.

Figure 2:
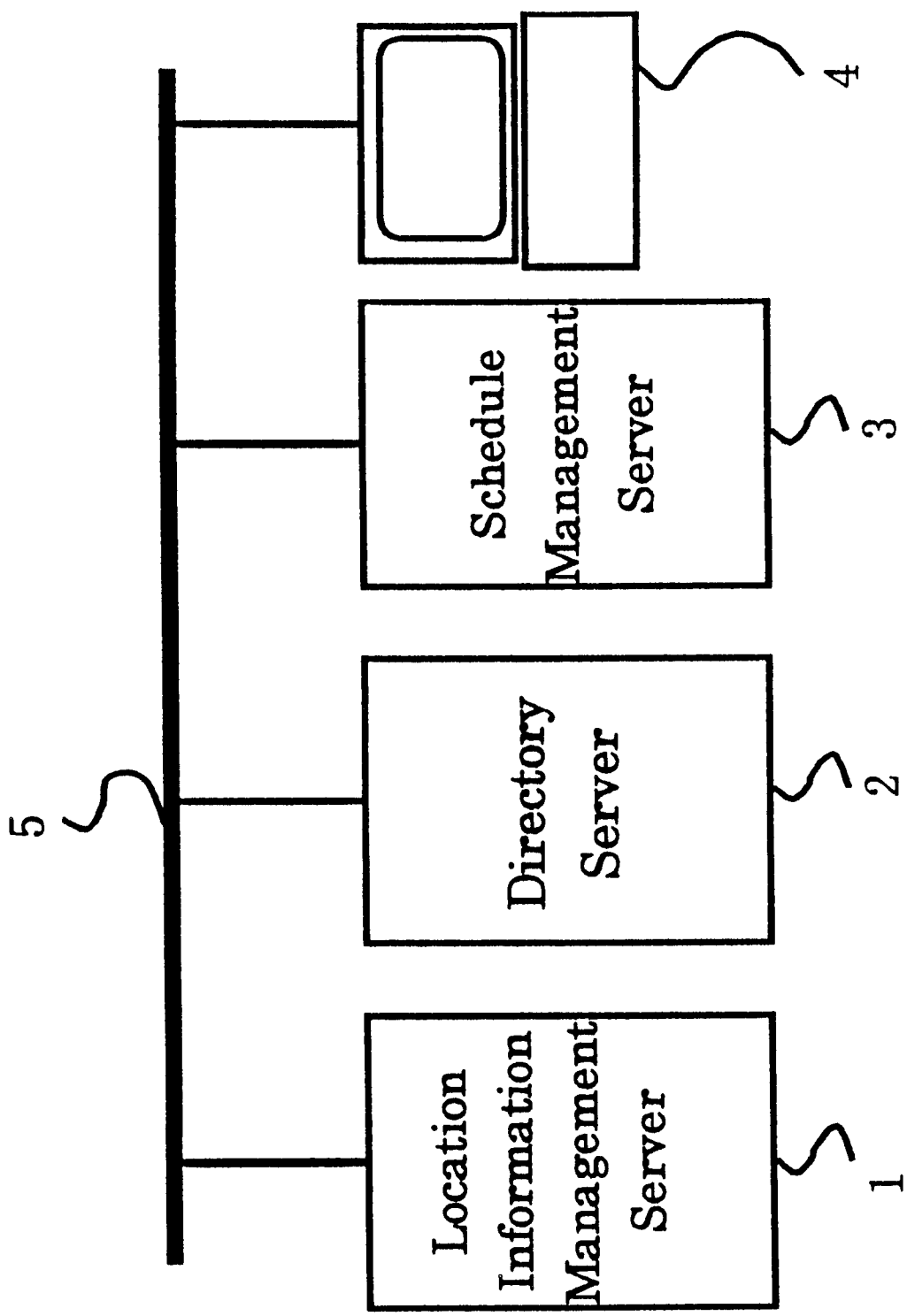
FIG. 2 is a view showing a system structure of a communication parameter search apparatus and a communication support apparatus using the same according to one embodiment of the present invention.

FIG. 2 is a view showing a system structure of a communication support apparatus using the communication parameter search apparatus of the present embodiment. As shown in FIG. 2, in the communication support apparatus of the present embodiment, the aforementioned location information management server 1, a directory server 2, a schedule management server 3 and one or a plurality of clients 4 are connected via a LAN 5.

Each server and each client consists of a processor and storing means such as a main memory, an auxiliary memory or the like. "A module" in the present embodiment may refer to a form of a program executed on the processor, or it may refer to a concept including an input or output device and data stored in the storing means.

The location information management server 1 manages location information as location managing means.

Figures 3, 4:
FIG. 3 is a view showing an exemplary data structure of location information.
FIG. 4 is a view showing an exemplary data structure of a table storing the corresponding relationship between sensor IDs and locations.

FIG. 3 shows an exemplary data structure of location information managed in the location information management server 1. As shown in FIG. 3, the location information includes a directory name and a location. Herein, the directory name functions as a search key for information concerning each user managed in the directory server 2 (hereinafter, referred to as "directory information"). In the present embodiment, the name of each user is used as the directory name.

Figure 5:
FIG. 5 is a view showing an exemplary data structure of a table storing the corresponding relationship between badge IDs and directory names.

A table (i) showing the corresponding relationship between the sensor ID and the location, shown in FIG. 4, and a table (ii) showing the corresponding relationship between the badge ID and the directory, shown in FIG. 5, are stored in the location information management server 1. As described above, the corresponding relationship between the sensor ID of a detected sensor and the badge ID of a detected badge is constantly transmitted to the location information management server 1 from each sensor. Therefore, it is possible to manage location information in a format shown in FIG. 3 by referring to the two tables described above. In the case where a plurality of users are detected by the same sensor, the directory names of the plurality of users are registered as location information.

The directory name is not necessarily a name, but an arbitrary number such as an employee number can be used as a directory name, as long as it can specify each user.

The location information data shown in FIG. 3 is stored periodically as location history information in the location information management server 1.

FIG. 6 shows an exemplary data structure of the location history information. As shown in FIG. 6, the location history information (iii) is stored in a form of a history of location information collected at a certain interval of time.

Figure 7:
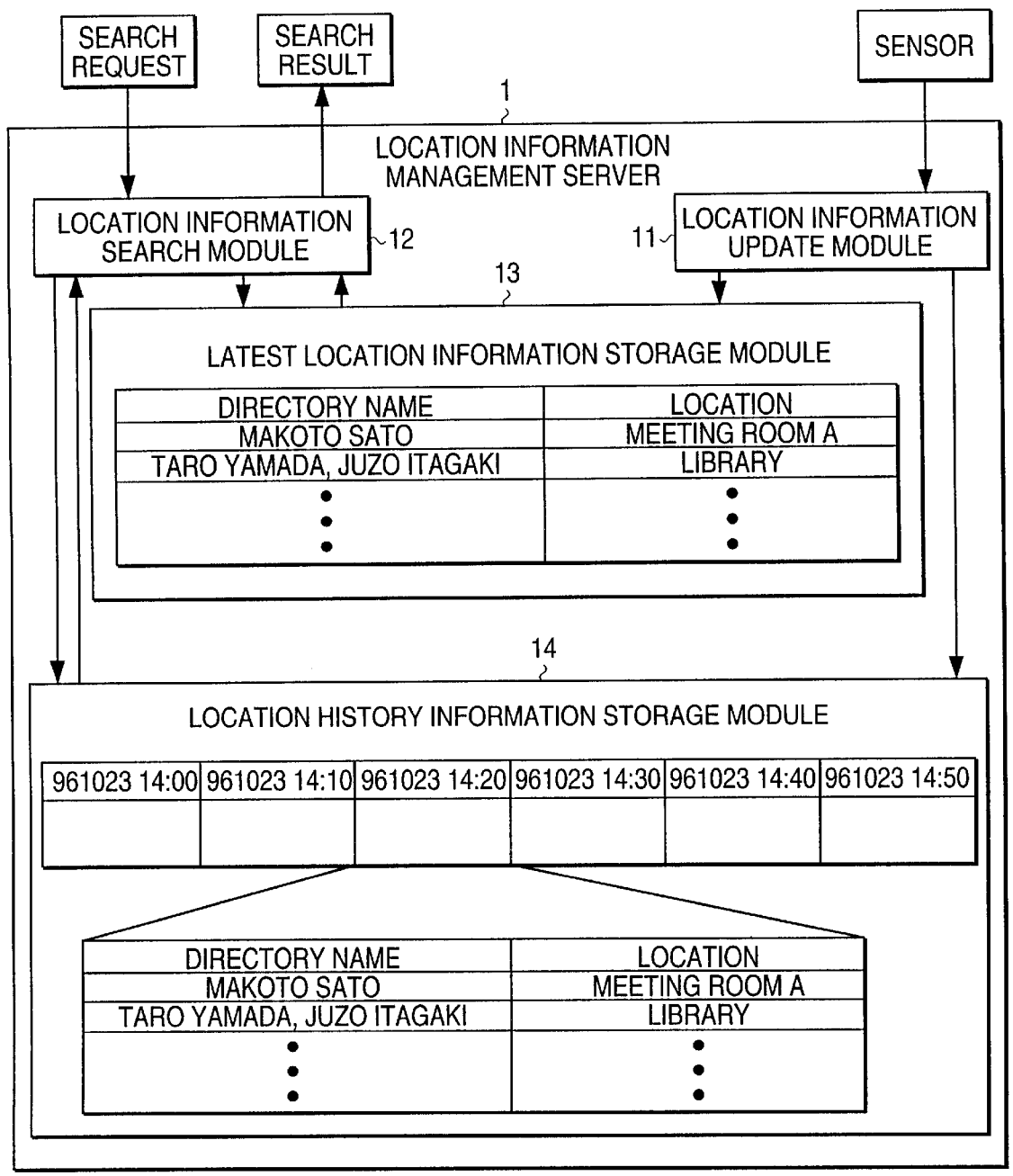
FIG. 7 is a view showing an exemplary module structure of a location information management server.

FIG. 7 shows an exemplary module structure of the location information management server 1.

As shown in FIG. 7, the location information management server 1 of the present embodiment includes a location information update module 11, a location information search module 12, a latest location information storage module 13, and a location history information storage module 14. In accordance with the input of signals transmitted from the sensor, the location information update module 11 updates latest location information showing the location of each user at that point of time, and location history information. The location information search module 12 returns a search result in response to a search request resulting from an input of a search key. The latest location information storage module 13 stores the latest location information. The location history information storage module 14 stores location history information.

In the location information management server 1, the location information update module 11 receives signals from each sensor. The location information update module 11 not only updates contents of the latest location information storage module 13, but also regularly adds location history information to the location history information storage module 14. Although not shown in FIG. 7, tables shown in FIGS. 4 and 5 are stored in the location information update module 11 in the present embodiment.

Furthermore, it is possible to search externally for the location information via the location information search module 12. The present embodiment has two types of information search as search patterns: information search from the latest location information; and information search from the location history information. A combination of the two types of information search is also possible.

The directory server 2 manages the aforementioned directory information concerning each user as communication parameter storing means. The directory information includes communication parameters. The directory information of the present embodiment contains not only communication parameters, but also other personal information such as employment date, place of duty, sex, age or the like.

FIG. 8 is a view showing an exemplary data structure of the directory information of the present embodiment. As shown in FIG. 8, the directory information of the present embodiment includes a directory name and communication parameters such as a mail address, a telephone number, a facsimile number or the like.

Figure 9:
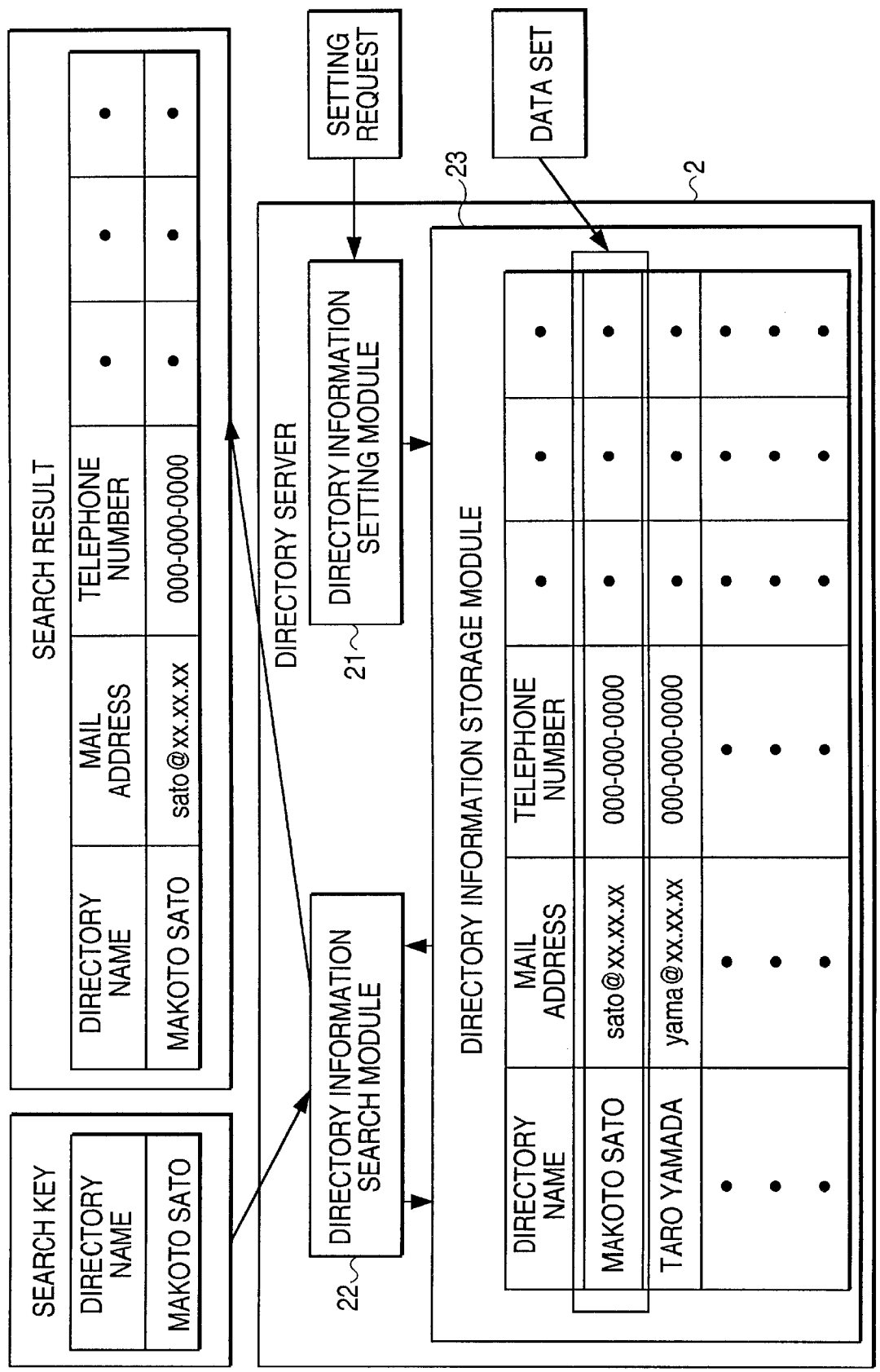
FIG. 9 is a view showing an exemplary module structure of a directory server.

FIG. 9 is a view showing an exemplary module structure of the directory server 2. The directory server 2 is required to be capable of performing data search with key words. More specifically, the directory server 2 can be realized by utilizing LDAP devised by University of Michigan and a part of a function provided in Netscape Suite Spot (trade name) manufactured by Netscape Communications Corporation. Data search with key words refers to a function which makes it possible to search for an entry of directory information concerning a user corresponding to a directory name (hereinafter, one entry of the directory information is referred to as "a data set"). For example, in FIG. 9, the directory name "Makoto Sato" is input as a search key.

Accordingly, the directory server 2 of the present embodiment includes a directory information setting module 21 for setting directory information by input from a user, a directory information search module 22 searching for directory information so as to return search results, and a directory information storage module 23 for storing the directory information.

A schedule management server 3 to which the schedule of each user is input manages the schedule, thus functioning as schedule storing means.

FIG. 10 is a view showing an exemplary data structure of schedule information according to the present embodiment. As shown in FIG. 10, the schedule information of the present embodiment includes the directory name of a planner, a start time, an end time, a topic, a location, directory names of participants and the like.

Figure 11:
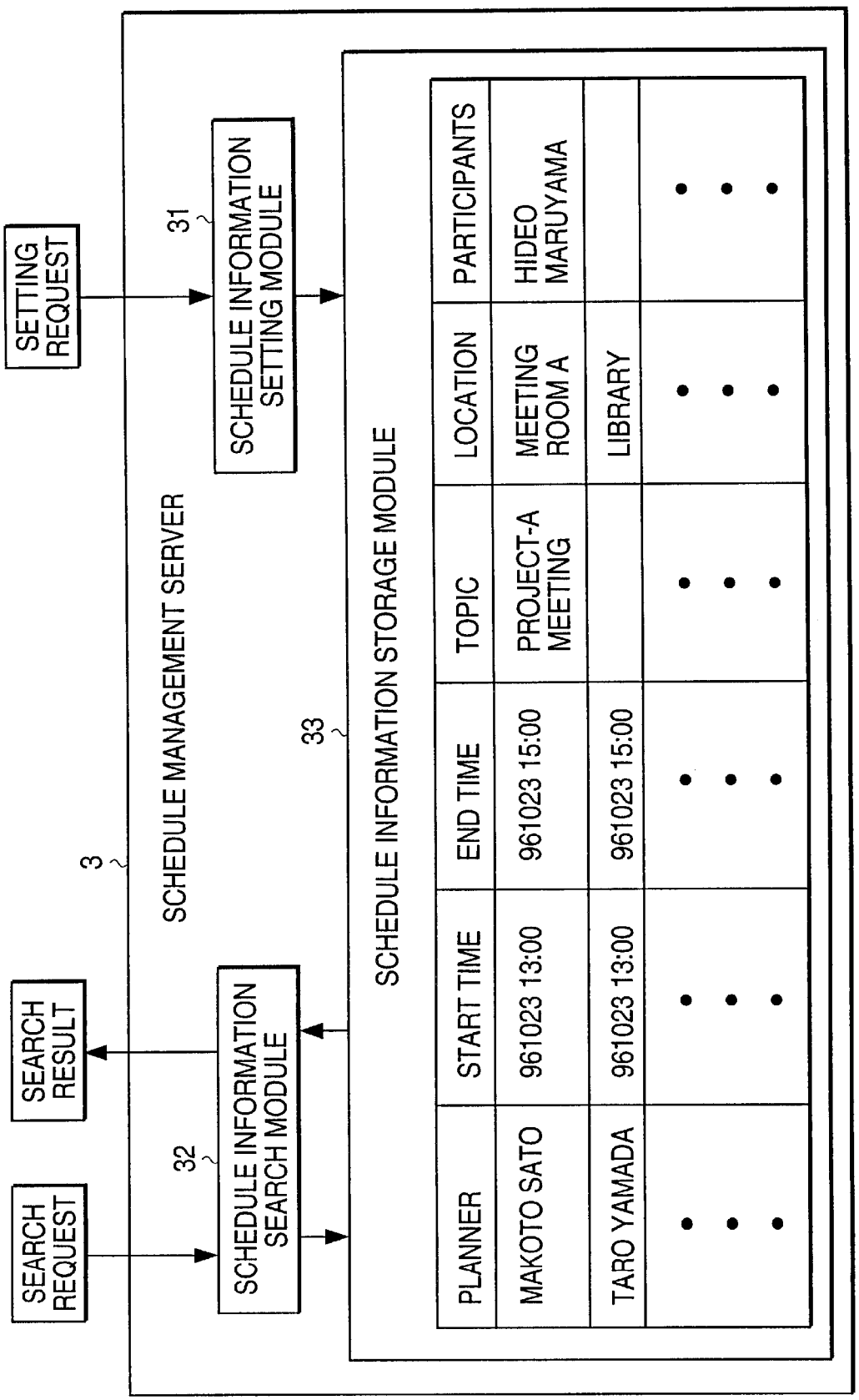
FIG. 11 is a view showing an exemplary module structure of a schedule management server.

FIG. 11 is a view showing an exemplary module structure of schedule management server 3 according to the present embodiment.

The schedule management server 3 of the present embodiment includes a schedule information setting module 31 for setting schedule information by an input from a user, a schedule information search module 32 for searching the schedule information so as to return search results, and a schedule information storage module 33 for storing the schedule information.

Each user sets his own schedule information to the schedule management server 3 having a structure as shown in FIG. 11 via a client 4. More specifically, a setting request for schedule information is input to the schedule information setting module 31 and input schedule information is stored in the schedule information storage module 33.

Furthermore, in response to a search request using a search key, the schedule information search module 32 performs a search process and outputs a search result.

Figure 12:
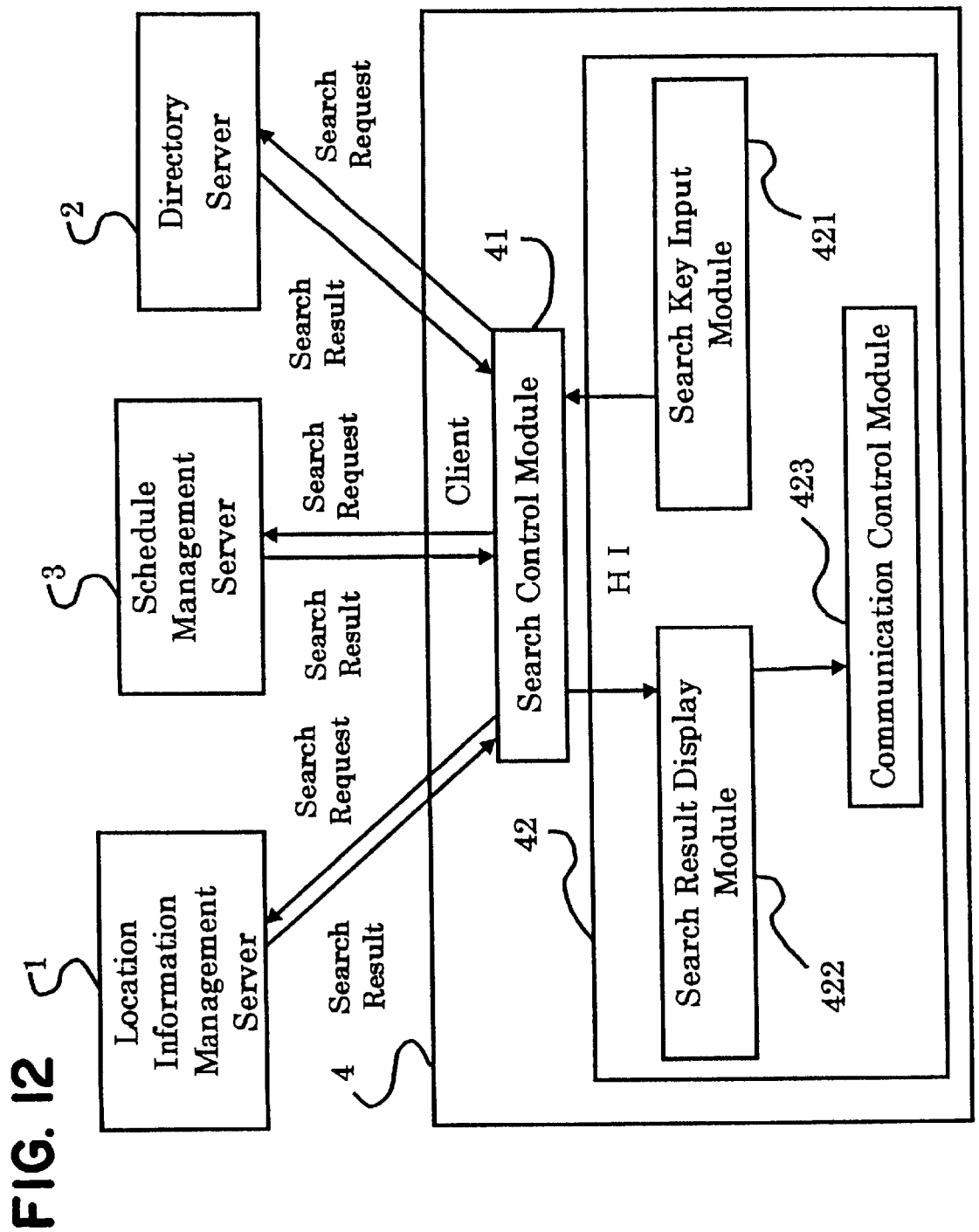
FIG. 12 is a view showing an exemplary module structure of a client.

FIG. 12 is a view showing an exemplary module structure of the client 4 functioning as user search means and communication parameter search means.

As shown in FIG. 12, the client 4 of the present embodiment includes a search control module 41 for controlling information search on each server, and a human interface (hereinafter, referred to as "HI") 42. The HI 42 includes a search key input module 421 for receiving an input of a search key from a user, a search result display module 422 for displaying search results and a communication control module 423 for controlling a communication process in the case of actually performing the communication process.

The search control module 41 transmits a location and a range of time input via the search key input module 421 as search keys to the location information management server 1 and the schedule management server 3 so as to get the directory names of users corresponding to the search keys from each of the servers. This means, more specifically, getting the directory names of users present in the location input by a user as the search key at the time input as the search key.

Thereafter, a search request is made using the directory name as the search key to the directory server 2 via the search control module 41. The communication parameters of users having the directory names are obtained from the search result. Furthermore, in order to actually perform communication, the communication parameters are transmitted to the communication control module 423 so as to start a communication process.

Figure 13:
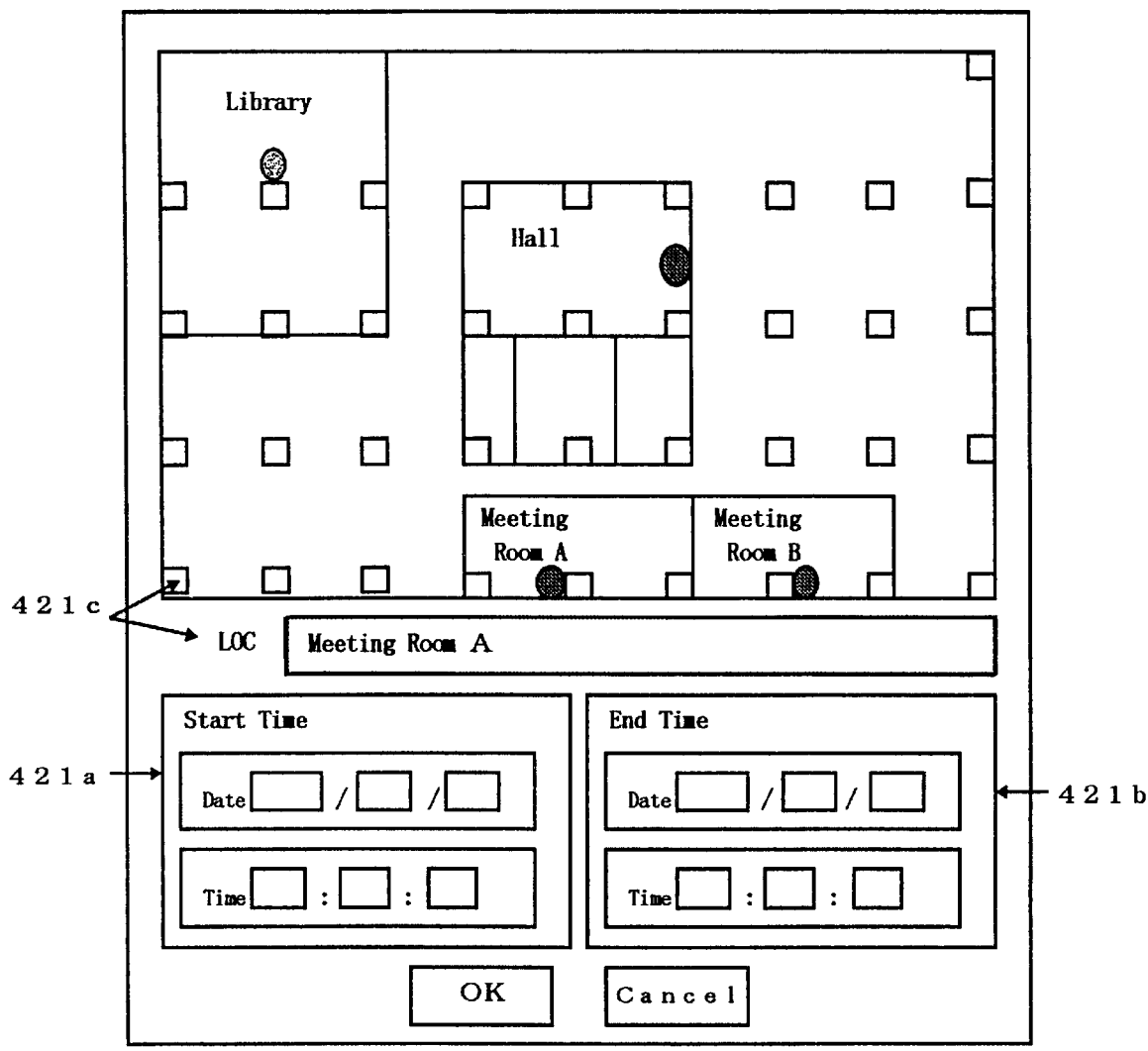
FIG. 13 is a view showing an exemplary display screen for inputting a location and a range of time as search keys.

FIG. 13 shows an exemplary display screen for designating a location and a range of time to be used as search keys in the client 4. This is a part of the search key input module 421 shown in FIG. 12. Using a start time input area 421a and an end time input area 421b on the screen shown in FIG. 13, a range of time which a user desires to search is designated.

In the case where time is not designated, information on users present in the location designated by a location input area 421c displayed on the upper part of the screen at the time of the search is subject to search. "LOC" in the FIG. 13 represents a location.

In the present embodiment, an actual indoor view is displayed, as seen in the location input area 421c shown in FIG. 13. Thus, the location is displayed by selecting a location using a pointing device such as a mouse. The location can be displayed by using strings or other signs. Furthermore, it is possible to correct input start time, end time and location.

Although not shown in FIG. 13, means for designating communication means can be further provided. In such a case, a user designates for which communication means a search result is to be used. By doing this, it is possible to get only a necessary communication parameter for the designated communication means, and to activate the designated communication means to actually perform communication.

Figure 14:
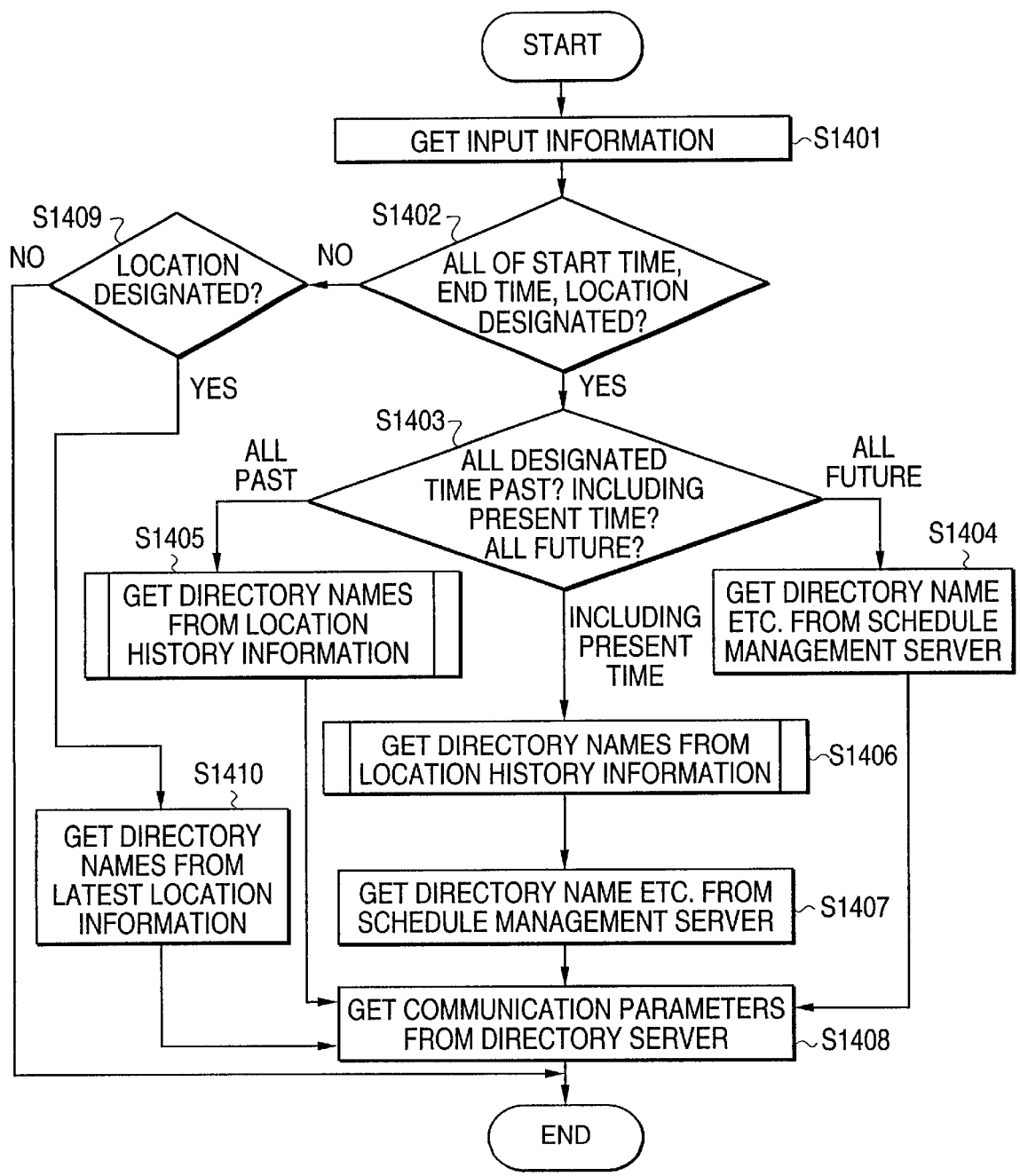
FIG. 14 is a flow chart illustrating procedures in a process of searching for communication parameters using location and time as search keys.

FIG. 14 is a flow chart illustrating procedures in a process of searching for a communication parameter using a designated start time, end time and location as search keys in the client 4.

The client 4 gets input information using the search key input module 421 (S1401), and determines whether or not all of the search keys, i.e., start time, end time and location, are designated (S1402). In the case where all of the three keys are designated (S1402:Yes), the client 4 determines whether the range defined by designated times is entirely in the past, includes the present time or is entirely in the future (S1403).

In the case where the whole range is in the future, it is necessary to search schedule information managed in the schedule management server 3 in order to search for users present in a designated location at a designated time. In this case, therefore, the designated time and the designated location are transmitted as search keys to the schedule management server 3, so as to get directory names, etc. of addressees to communicate with (S1404). Herein, the term "directory name, etc." is used, because a time at which the addressee is due to leave the location (hereinafter, referred to as "leaving time") is included in the schedule information, and the leaving time, i.e., an end time in schedule information shown in FIG. 10, can be obtained. A method for utilizing this information will be described later.

On the other hand, in the case where the range of a designated time period is entirely in the past, in order to search for users present in a designated location at the designated time, it is sufficient to search location history information managed in the location information management server 1. In this case, therefore, the designated time and the designated location are transmitted as search keys to the location information management server 1, so as to get directory names, etc. of addressees to communicate with (S1405).

In the case where the range defined by designated times includes the present time, it is necessary to search both of the location information management server 1 and the schedule management server 3. In this case, therefore, first, the location history information managed in the location information management server 1 is searched (S1406), and then schedule information managed in the schedule management server 3 is searched (S1407), so as to get directory names of addressees to communicate with and an end time included in the schedule information as described above.

Figure 15:
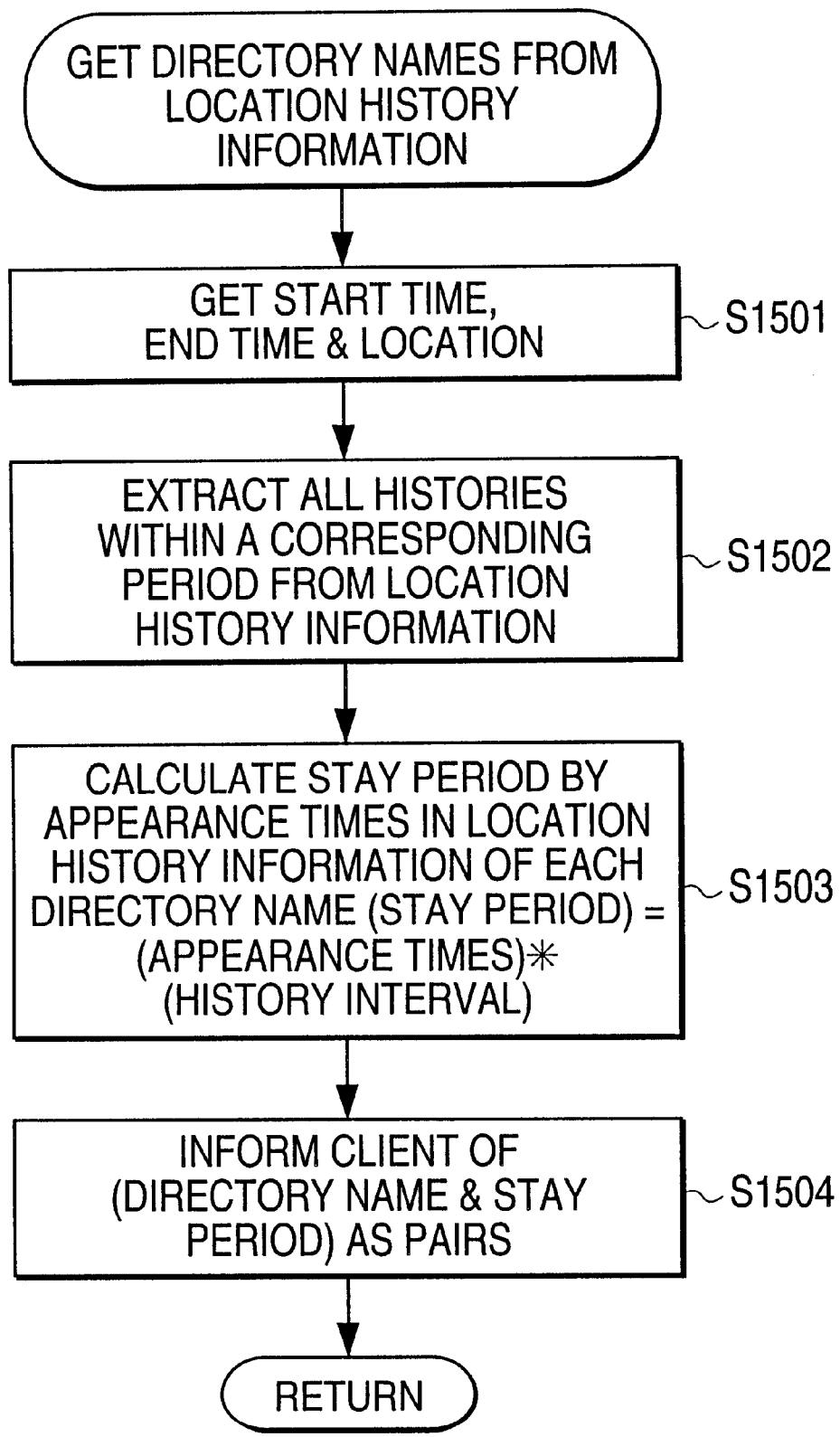
FIG. 15 is a flow chart illustrating detailed procedures in a process of getting the directory names of users to communicate with from a location information management server.

FIG. 15 is a flow chart illustrating procedures performed by the location information management server 1 in the process of "Get Directory names from Location History Information" at S1405 and S1406.

As shown in FIG. 15, the location information management server 1 gets a start time, an end time and a location transmitted as search keys from the client 4 (S1501). Next, the location history information is searched so as to extract all information in the range defined by the designated times as the search keys (S1502).

Next, the location information management server 1 calculates the period that each user stayed in the location (hereinafter, referred to as "stay period") using the number of times each user appears (hereinafter, referred to as "appearance times") in an extracted location history information (S1503). In the present embodiment, the stay period of each user is obtained with the following formula:

(Stay period)=(Appearance times)*(History interval)

where, "history interval" refers to an interval between times when location history information is added. In the present embodiment, the history interval is 10 minutes.

When the above-mentioned procedures are completed, the location management server 1 transmits pairs of a directory name and a stay period to the client 4 (S1504).

A detailed description of "get a directory name of an addressee from the schedule management server 3" is omitted herein, because it is realized by using a search function provided in an existing schedule management software. One example of the schedule management software is "Microsoft Exchange" (trade name) manufactured by Microsoft Corporation.

Referring back to the flow chart shown in FIG. 14, by performing the above-mentioned processes, the client 4 which got the directory name of an addressee for communication gets a communication parameter from the directory server 2 using the directory name as a search key (S1408). A detailed description of the process "get a communication parameter from the directory server 2" is omitted herein, because the information search is performed by using a search function provided in an existing schedule management software with the directory name as the search key.

On the other hand, at S1402, in the case where not all of the three search keys, i.e., the start time, the end time, and the location, are designated (S1402: No), the client 4 determines whether or not at least the location is designated as a search key (S1409).

In the case where a location is not designated (S1409: No), since the search for users to communicate with does not make sense, a further process is not performed and the whole procedure ends.

In the case where a location is designated and a time is not designated (S1409: Yes), the time of the input is regarded as being designated. Thus, referring to the latest location information managed in the location information management server 1, the directory names of users present in the location at the moment is obtained (S1410). Furthermore, a communication parameter is obtained by searching the directory server 2 using the obtained directory name as a search key (S1408).

FIG. 16 is a view showing a case for more specifically illustrating the above-mentioned procedures. In this case, search keys are as follows: start time, Oct. 23, 1996, 14:00; end time, the same date, 14:30; location, Meeting room A (see FIG. 16(a)). In this case, input times are all in the past.

Therefore, in this case, the client 4 outputs a search request to the location information management server 1, so that the location information management server 1 searches the location history information. As a result, from the location history information in the corresponding time period, three users, i.e., "Makoto Sato", "Junichi Inoue", "Koichi Kato", are obtained as users present in Meeting room A in the time period of interest (see FIG. 16(b)).

Using appearance times in the location history information of each user, a stay period is obtained and made a pair with the directory name so as to be transmitted to the client 4 (see FIG. 16(c)).

Next, display of obtained information to the client 4 will be described.

Figure 17:
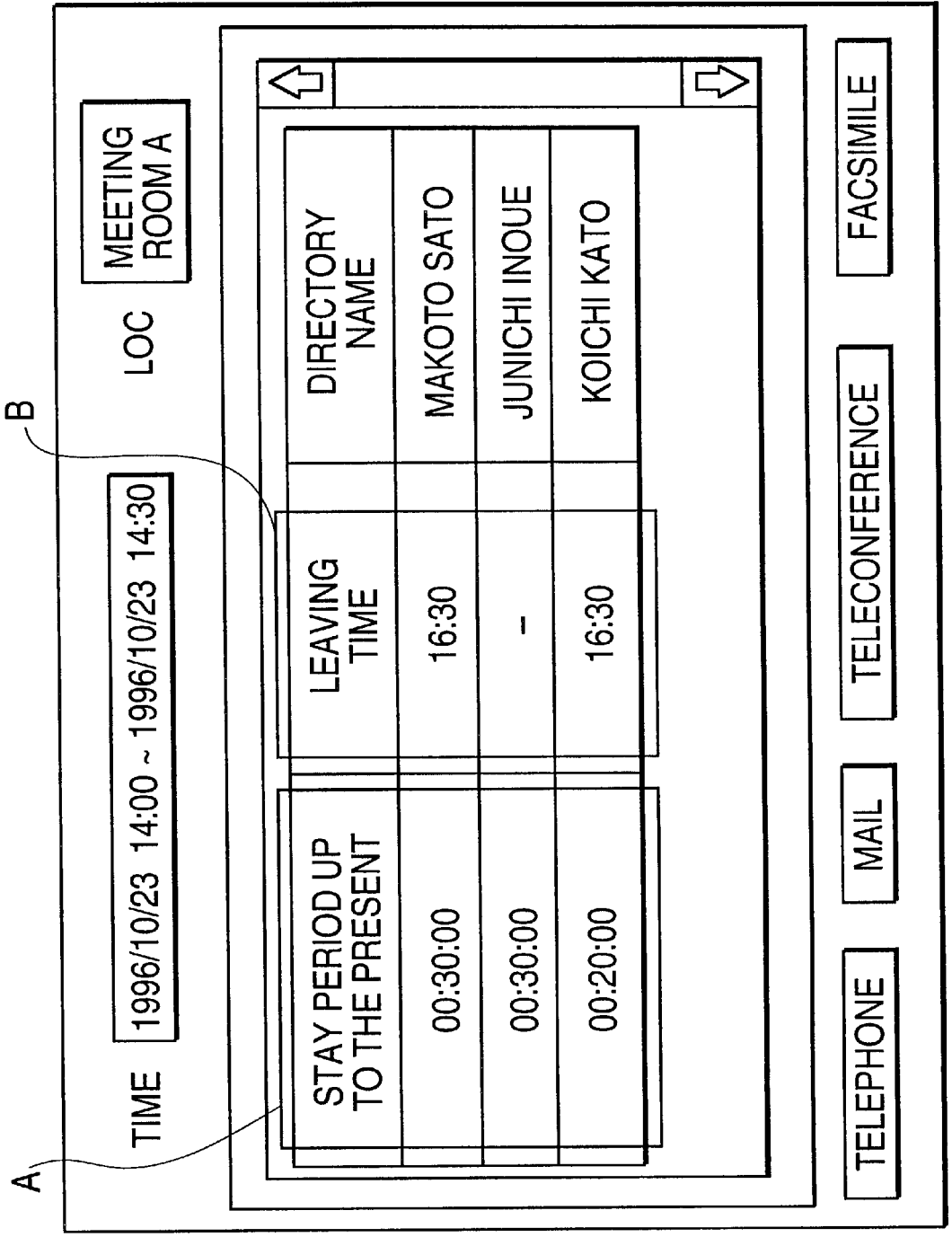
FIG. 17 is a view showing an exemplary screen on which searched communication parameters are displayed.

FIG. 17 is a view showing an exemplary display screen on the client 4.

As shown in FIG. 17, in the present embodiment, search results are displayed in the order of the stay period up to the present (A) obtained from location information management server 1. In addition, for convenience of users, in the case where the range of the designated time includes the present time or is entirely in the future, an end time obtained from the schedule management server 3 is displayed as a leaving time (B) obtained from schedule management server 3, as described above. The leaving time may be excluded from the display. In the case where the range of the designated times is entirely in the past, it is not necessary to change the process procedures, because the end time is not obtained in the case where the leaving time is displayed. But in the other cases, it will be sufficient to get only directory names of addressees at S1404 and S1407.

Other manners for display are possible. For example, the display may be effected based on an expected total stay period, which can be calculated by subtracting the present time from the leaving time (can be obtained from the schedule information), so as to obtain an expected remaining time period of a scheduled event (e.g., "a meeting"), and adding the calculation result to the stay period up to the present. Alternatively, the display may be effected based on the directory names or the like.

However, in the case where display is effected based on the stay period up to the present, or an expected total stay period, it is easy to identify users who stay for a short time, i.e., those who are not involved in the event, though a sensor happens to respond. Thus, it is possible to prevent unnecessary communication.

Figure 18:
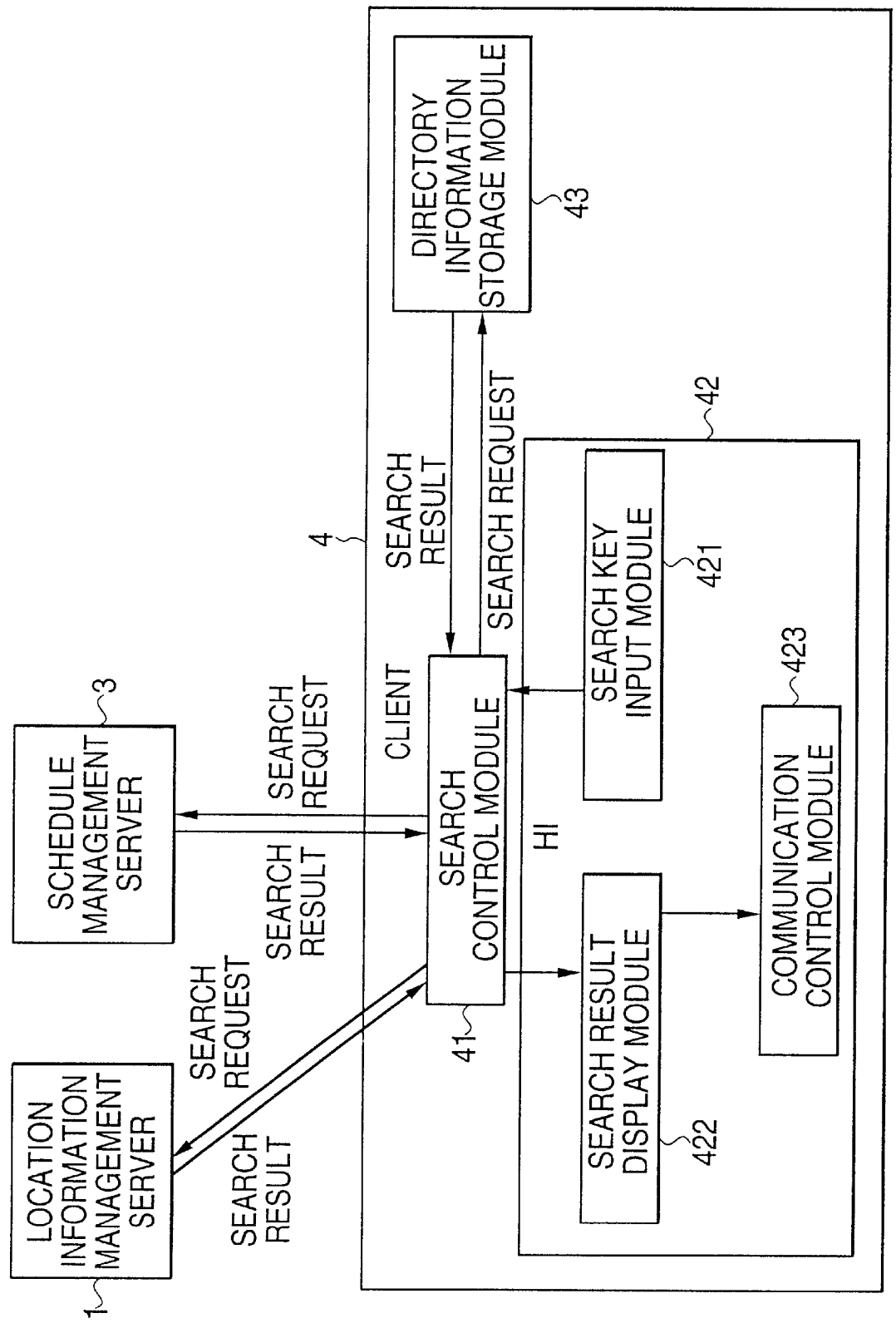
FIG. 18 is a view showing an exemplary module structure of a client in the case where a directory information storage module is provided in the side of the client.

It is possible to reduce overhead necessary for transmission of a search request and a search result between the server and the client by eliminating the directory server 2, and storing the directory information in the client 4 so as to search the interior of the client 4 for communication parameters. FIG. 18 shows an exemplary module structure of the client 4 in the case the directory information storage module 43 is provided in the client.

Next, as a second embodiment of the present invention, a communication support apparatus according to the present invention in the case where a mail is used as communication means will be described with reference to the accompanying drawings.

Figure 19:
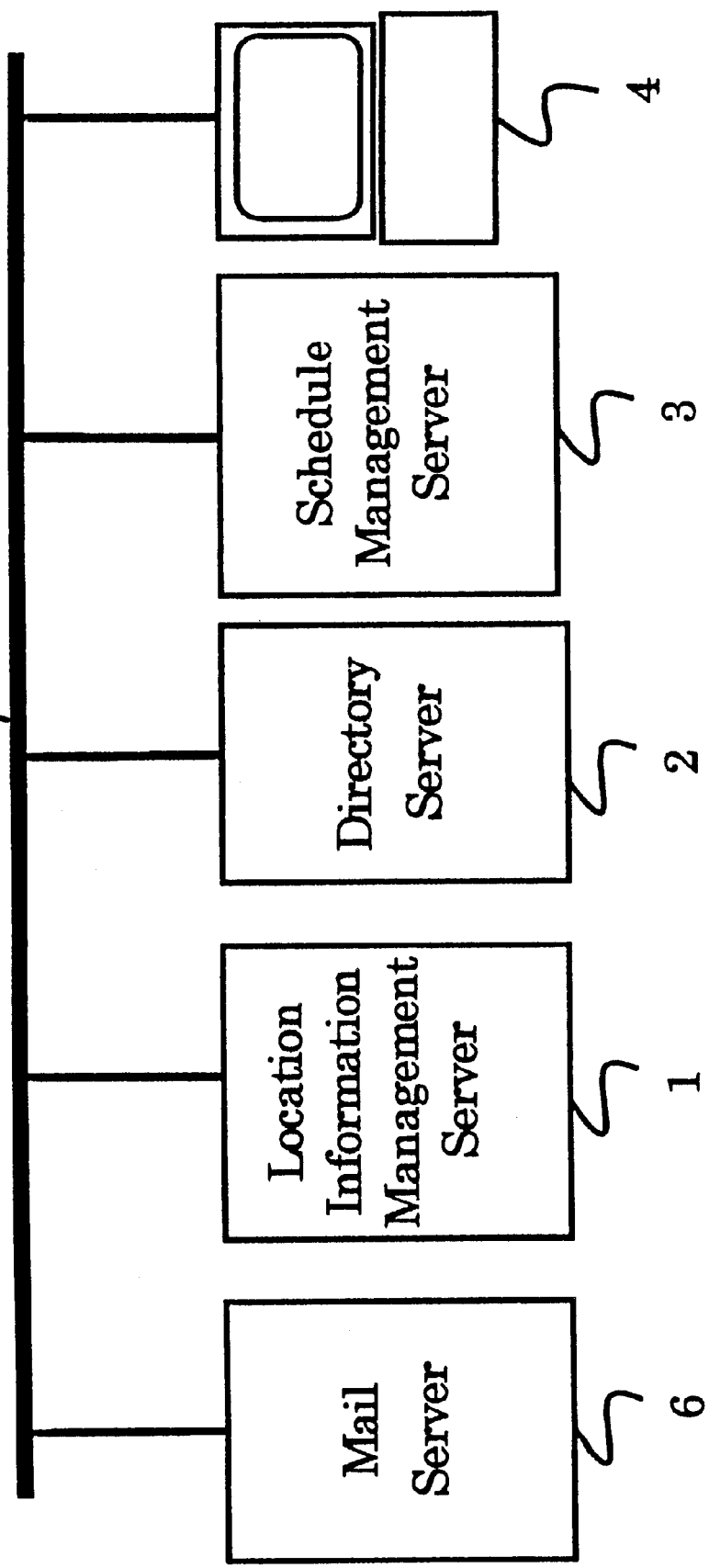
FIG. 19 is a view showing an exemplary system structure in the case where a mail is used as communication means.

FIG. 19 is a view showing the system structure in the case where a mail server 6 is added to the system structure shown in FIG. 2 as communication means.

The present invention can be applied to a telephone, a mail, a facsimile, a teleconference or various other communication means. First, the case where the mail is used as the communication means will be more specifically described.

Figure 30:
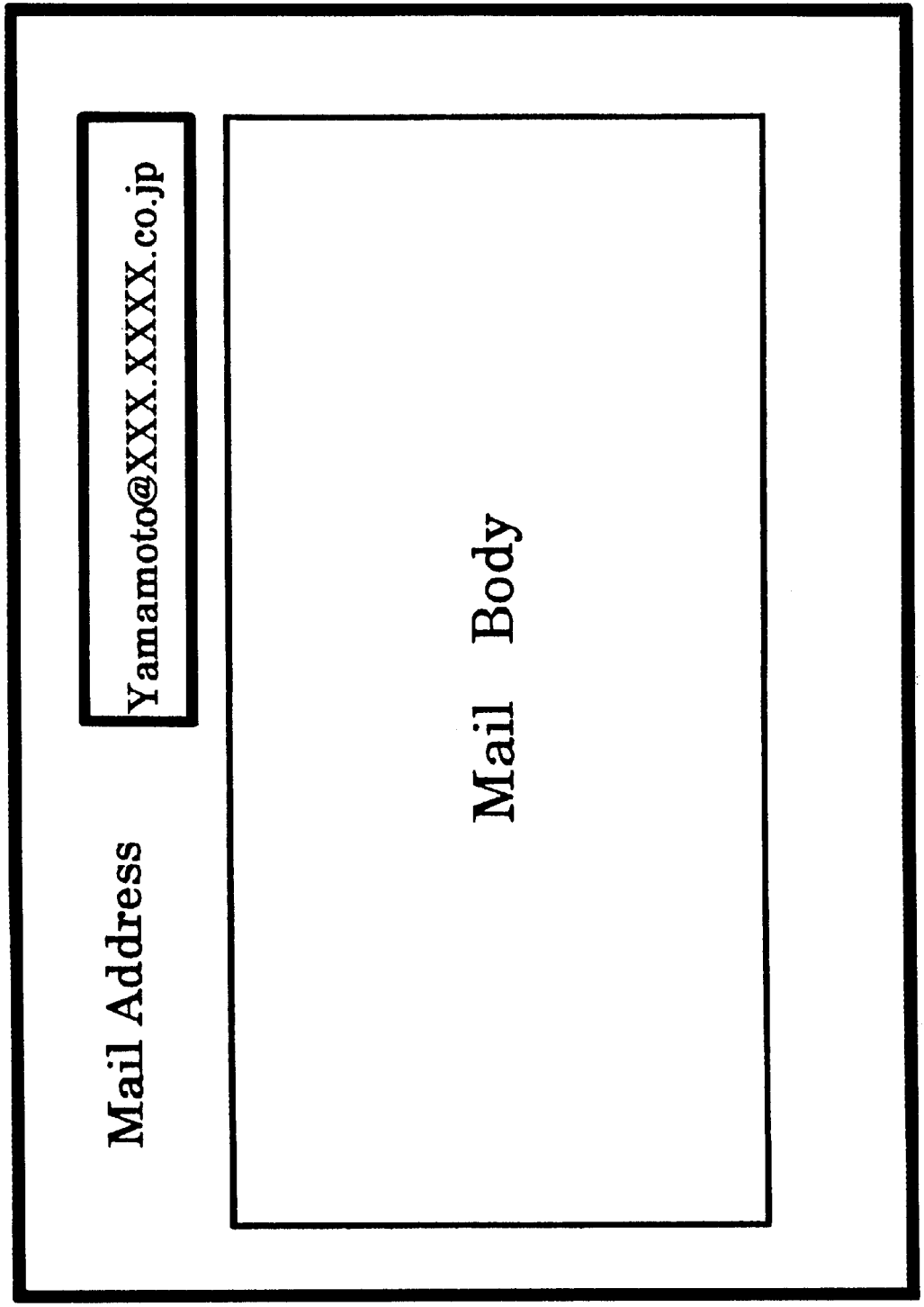
FIG. 30 is a view showing an exemplary display screen for inputting a mail address in a conventional mail system.

As described above, in a conventional mail system, it is necessary to input a mail address of an addressee using a screen shown in FIG. 30.

In a communication support apparatus of the present embodiment, for example, a screen displays in the manner as seen in FIG. 20, where a location and a range of time are input as search keys. Using the communication parameter search apparatus of the present invention, it is possible to specify an addressee to communicate with without inputting a mail address of each user so as to actually transmit mails.

Hereinafter, a portion provided as an option in FIG. 20 will be described.

First, if a minimum stay period is designated, users who stay for a shorter period than the minimum stay period at a designated location can be excluded from the search object of the communication parameter. This makes it possible to omit transmission of mails to users who are present for an extremely short time, i.e., users who are not involved in the event.

Furthermore, by designating an attribute value parameter, the range of addressees to communicate with can be further limited. In the example shown in FIG. 20, only users having directory information of working in "○○ sales office" are specified as addressees.

Furthermore, if a communication start time is previously set, a mail can be transmitted at any given time regardless of the designated time as a search key. "Confirm?" shown in FIG. 20 is for designating whether or not to confirm an addressee to communicate with at the time of actual transmission of mails. The procedure of the communication parameter confirmation process will be described later.

In the case where a mail is actually transmitted, it is necessary to get a mail address of an addressee as a communication parameter. In the communication parameter search apparatus described above, after inputting a location and a range of time as search keys, the client 4 gets the mail address of the addressee from the directory server 2. However, in this process, it is possible for a mail server 6 to get the mail address of the addressee instead of the client 4.

For example, in the case where a mobile terminal is used as the client 4, it may be difficult to keep the power of the client 4 constantly on, or to keep the client 4 constantly connected to the network. In such a case, especially, in the case where transmission of a mail is desired at a time when the client 4 is in motion so that it cannot be supplied with electric power, it is effective to let the server instead of the client 4 perform a search process of a communication parameter or an actual communication process using communication means.

Figure 21:
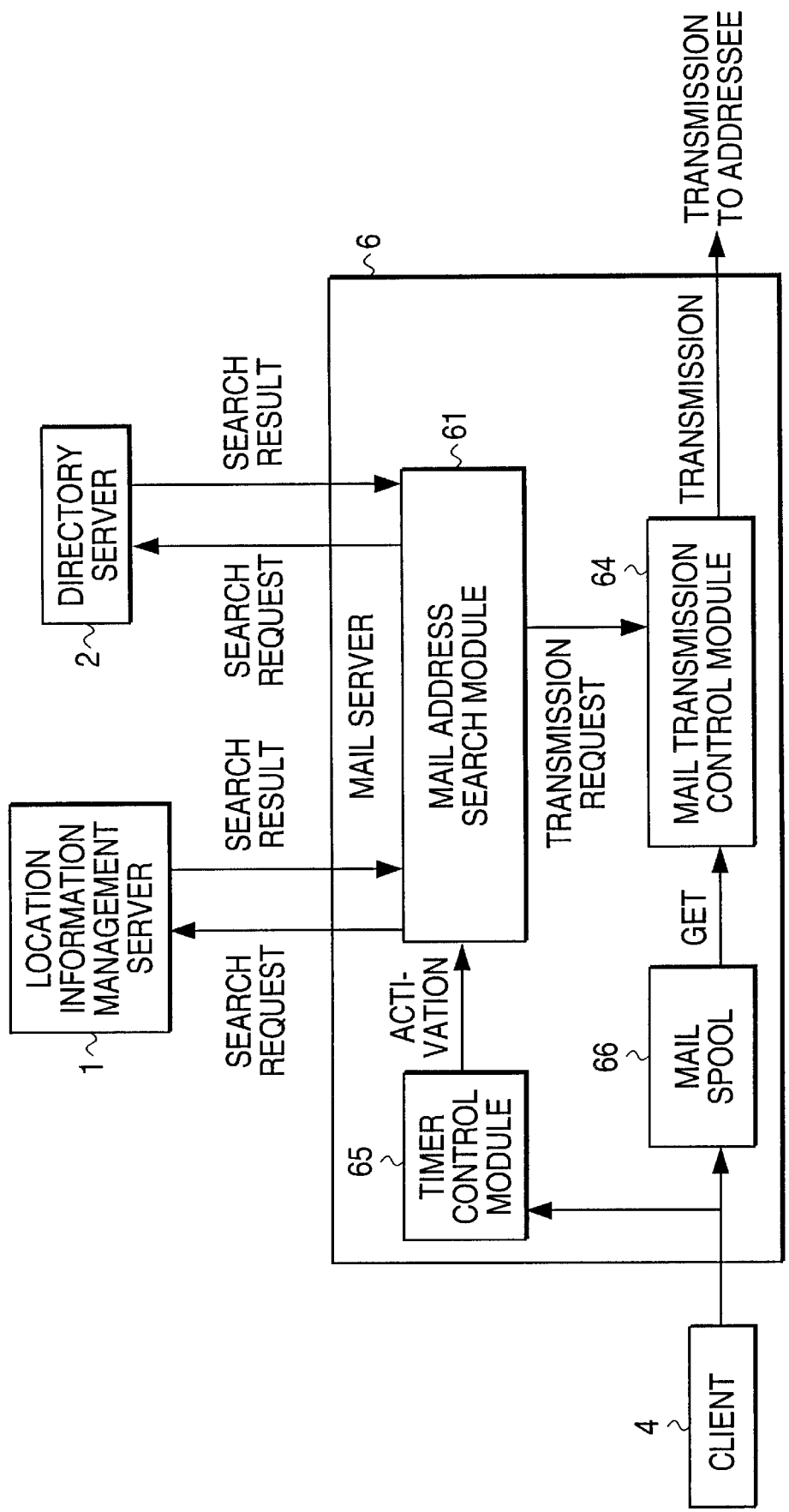
FIG. 21 is a view showing an exemplary module structure of a mail server.

FIG. 21 is a view showing an exemplary module structure of the mail server 6, in the case where a process of getting mail addresses of addressees using a location and a range of time as search keys and other processes up to transmission of mails to each user are performed by the mail server 6.

In the module structure shown in FIG. 21, a location and a range of time are input as search keys in the side of the client, and the search keys are transmitted together with the mail body to the mail server 6. Thus, a communication parameter is searched for at a designated time in the side of the mail server 6, and then the mail can be transmitted.

In the example shown in FIG. 21, a timer control module 65 is connected to a mail address search module 61, so that a search process of a mail address is started at a designated time. Furthermore, a mail transmission control module 64 is provided with a mail spool 66, so that the mail body transmitted from the client 4 is stored therein until the time of actual transmission.

Figure 22:
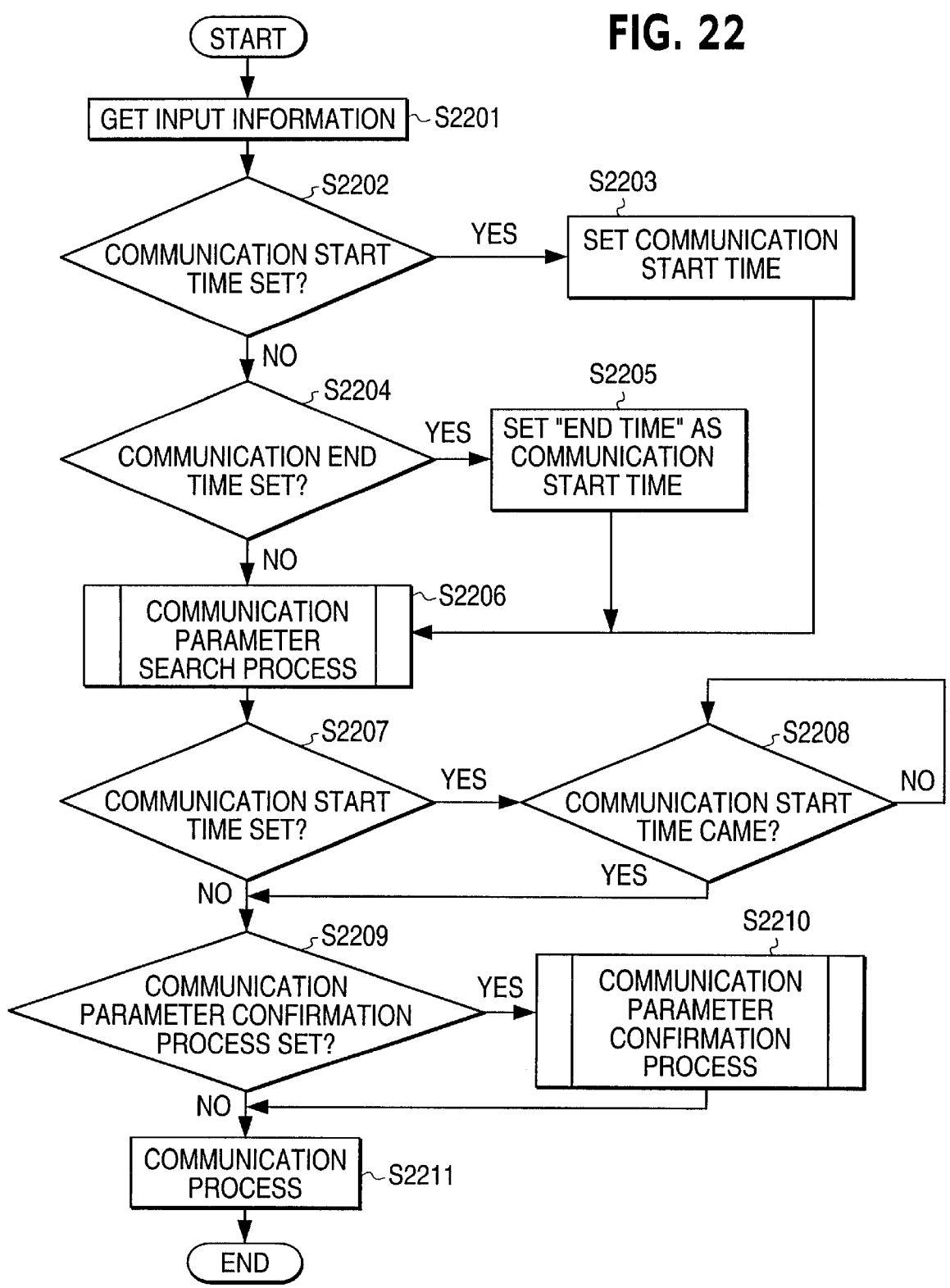
FIG. 22 is a flow chart illustrating detailed procedures in searching for communication parameters.

FIG. 22 is a flow chart illustrating process procedures in the case where the mail server 6 having the module structure shown in FIG. 21 searches for communication parameters.

When the mail server 6 gets a start time, an end time and a location designated by a user as search keys, and other optional parameters as input information (S2201), first, it is determined whether or not a communication start time is set (S2202). In the case where the communication start time is set (S2202: Yes), the set communication start time is set as a transmission time of a mail (S2203). In the case where the communication start time is not set (S2202: No), it is determined whether or not an end time is set as a part of the search key (S2204). In the case where the end time is set (S2204: Yes), the set end time is set as a transmission start time (S2205). In other words, in this case, the mail is transmitted at the end time designated as a search key.

Thereafter, the mail server 6 searches the directory server 2 for a communication parameter (S2206).

Figure 23:
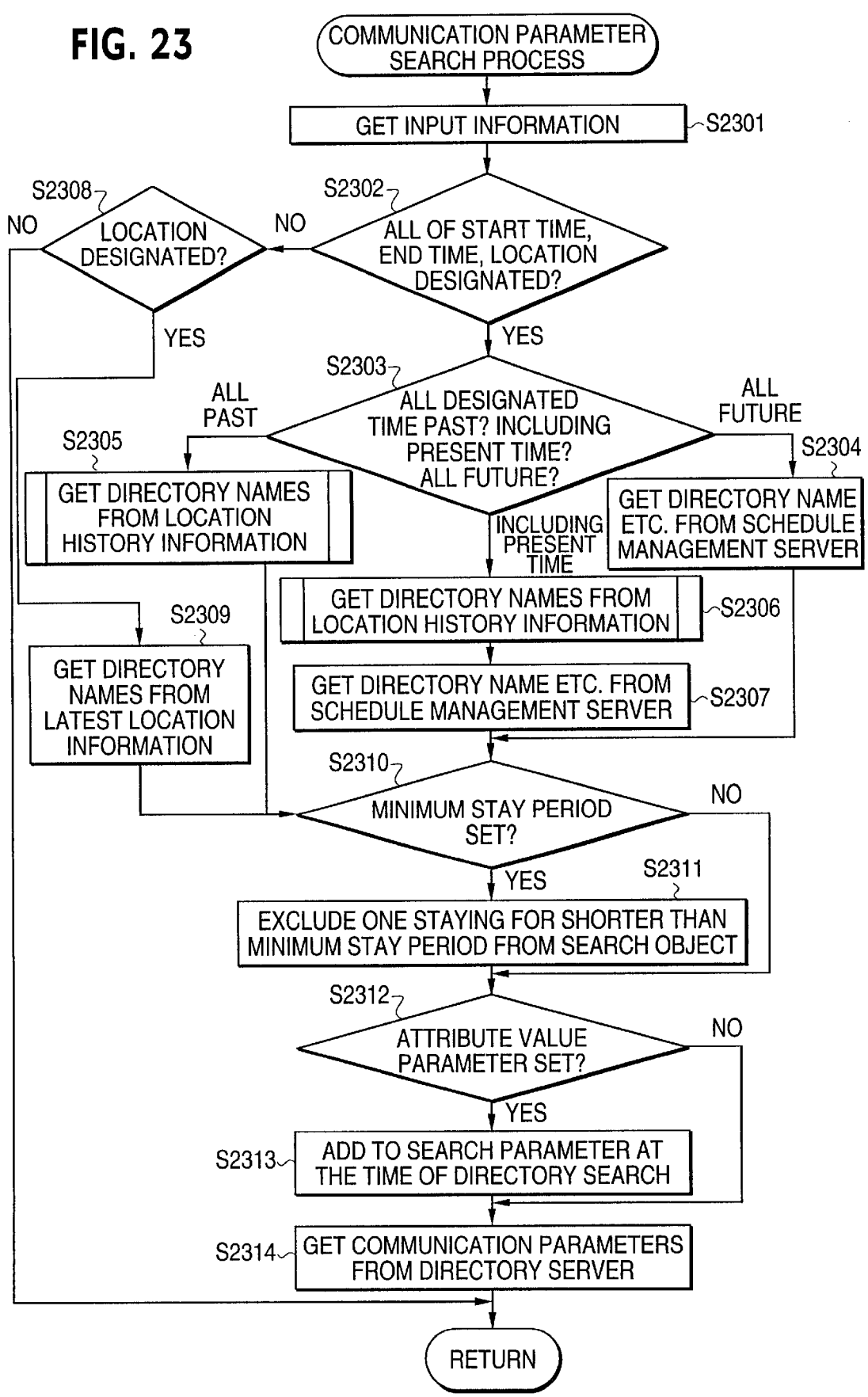
FIG. 23 is a flow chart illustrating detailed procedures in a communication parameter search process of S2206 in the flow chart shown in FIG. 22.

FIG. 23 is a flow chart illustrating a detailed procedure of "a communication parameter search process" at S2206. In the present embodiment, the mail is used as communication means. Accordingly, an example of using the mail will be described, but this procedure can be applied for other cases where other communication means are used. In other words, in the present embodiment, the communication parameter is a mail address. However, a facsimile number, for example, can be the communication parameter in the case where a facsimile is used.

The procedure shown in FIG. 23 is substantially equivalent to the procedure described referring to FIG. 14 (S2301~S2309). However, as shown in FIG. 20, since, in the present embodiment, a minimum stay time and an attribute value parameter can be set as optional input information, the search range of the directory server 2 in the process of getting a communication parameter from the directory server 2 can be further limited (S2310~S2314).

More specifically, in the processes up to S2309, after the directory names of addressees to communicate with are obtained, it is determined whether or not the minimum stay period is set (S2310). In the case where the minimum stay period is set (S2310: Yes), the users whose stay period is shorter than the minimum stay period are excluded from the search object (S2311).

Furthermore, it is determined whether or not the attribute value parameter is designated (S2312). In the case where the attribute value parameter is designated (S2312: Yes), the designated attribute value parameter is added to search parameters at the time of directory search (S2313).

Next, referring back to the flow chart of FIG. 22, the mail server 6 determines whether or not a communication start time is set as input information (S2207). When the communication start time is set (S2207: Yes), the execution of the communication process awaits the preset time (S2208). When the preset communication start time comes (S2208: Yes), or in the case where the communication start time is not set (S2207: No), the mail server 6 determines whether or not a communication parameter confirmation process is required (S2209). More specifically, in the case where an optional item "Confirm?" displayed on the screen is selected by clicking, the communication parameter confirmation process is required to be performed. The communication parameter confirmation process is to confirm at the time of transmission whether or not the addressee specified by the communication parameter search apparatus in the present embodiment is appropriate.

Figure 24:
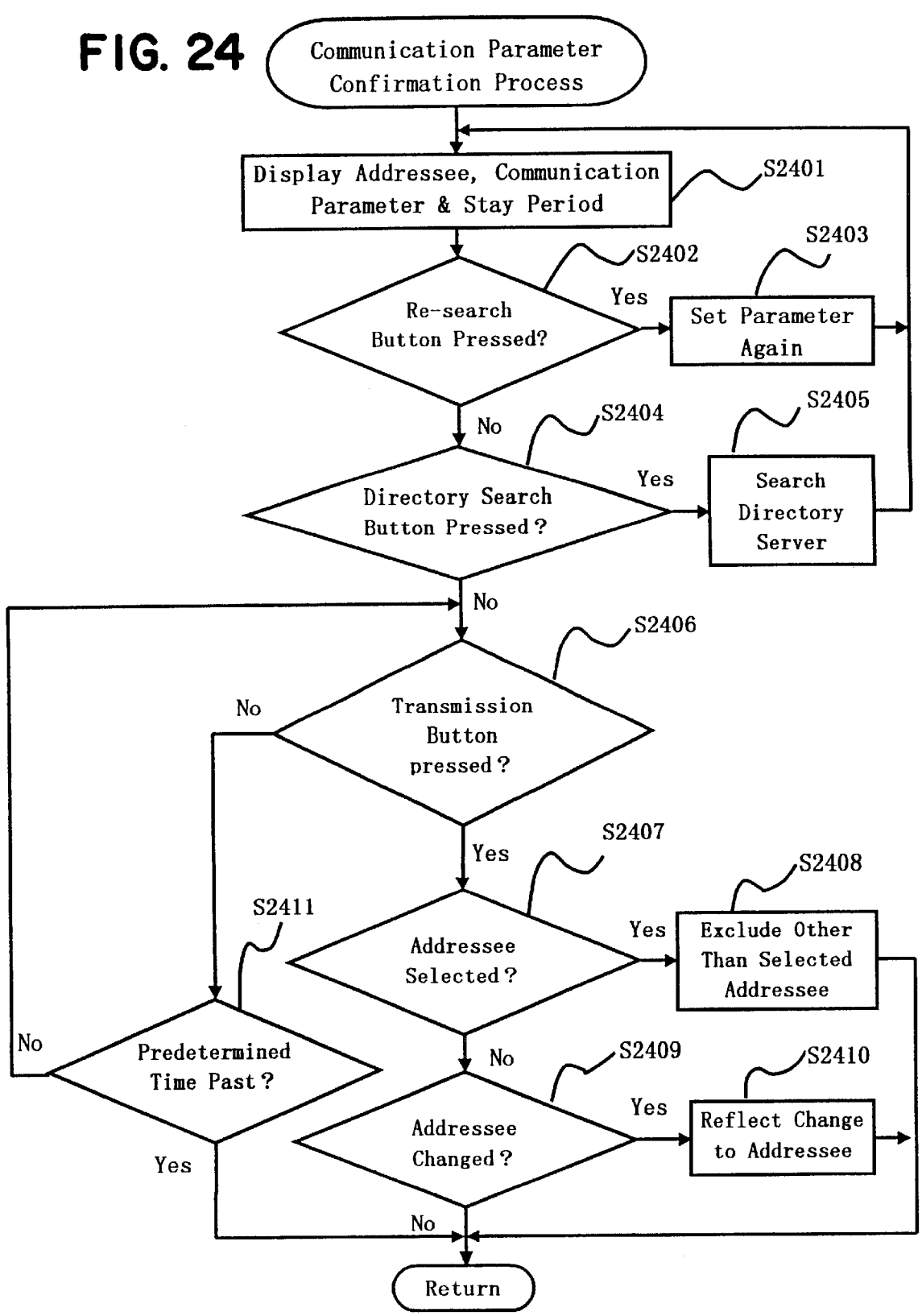
FIG. 24 is a flow chart illustrating detailed procedures in a communication parameter confirmation process of S2210 in the flow chart shown in FIG. 22.

FIG. 24 is a flow chart illustrating detailed procedures of the mail server 6 in the communication parameter confirmation process.

Figure 25:
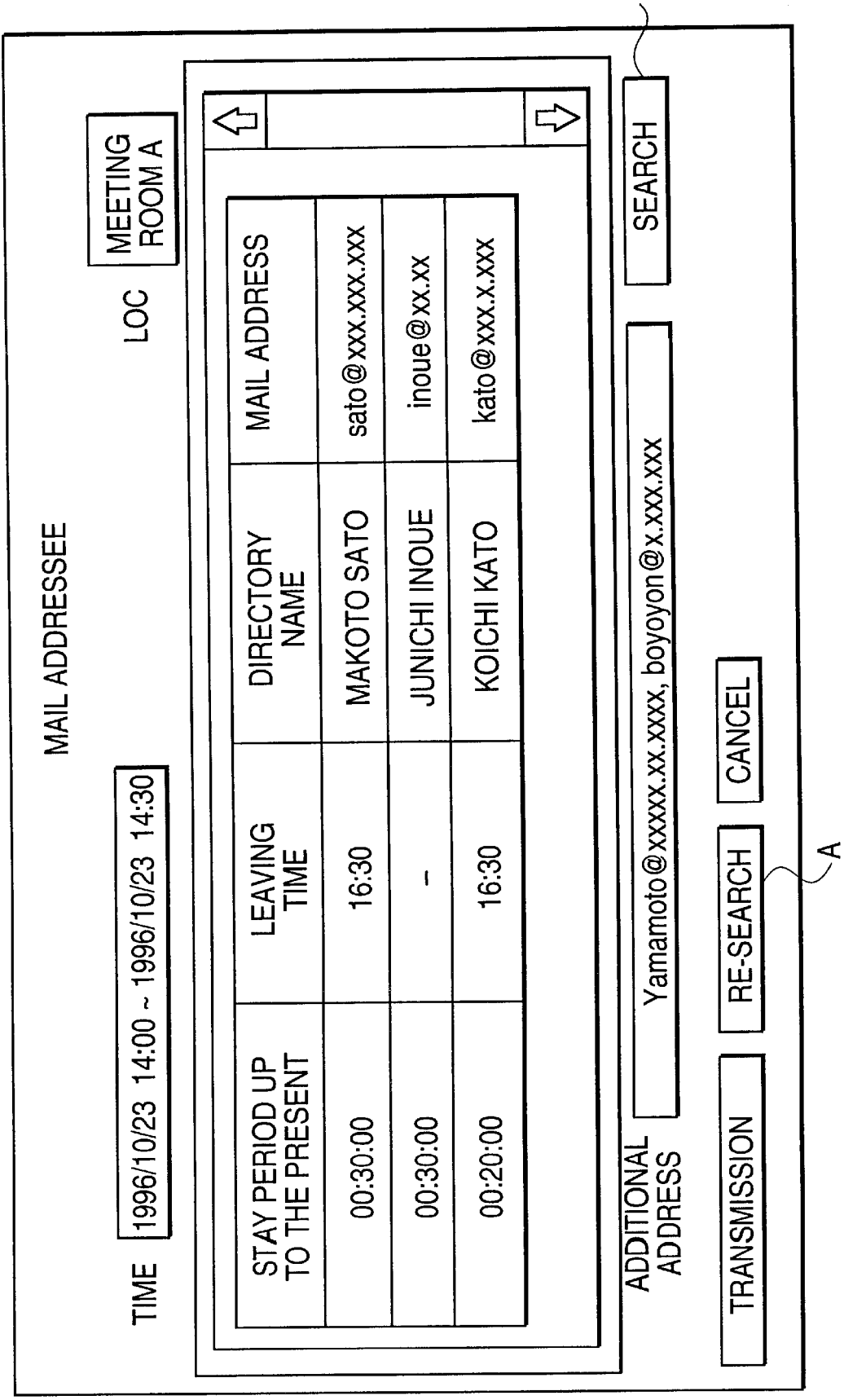
FIG. 25 is a view showing an exemplary display screen in a communication parameter confirmation process.

In the communication parameter confirmation process, the mail server 6 first displays addressees, communication parameters and stay period on the screen (S2401). As described above, the communication parameter is a mail address in the present embodiment, and "communication start" means transmission of the mail. FIG. 25 is a view showing an exemplary display screen in the client 4 in the process of communication parameter confirmation.

The mail server 6 first determines whether or not a re-search button (A) for going back to the screen of FIG. 20 and changing the parameters is pressed (S2402). Re-search refers to a process where the display on the screen as shown in FIG. 20 is effected once again, and search parameters are input once again. More specifically, in the case where a re-search button is pressed (S2402: Yes), search parameters are set once again, and the procedure goes back to S2401 (S2403).

Next, the mail server 6 determines whether or not a directory search button (B) for activating a directory search client so as to add the search results to an address is pressed (S2404). The directory search button refers to a button for activating a client for directory search so as to search additional directory information.

In the case where the directory search button is pressed (S2404: Yes), the directory server is searched via the client for directory search (S2405), and search results are added to the communication parameter and the procedure goes back to S2401.

When neither of the re-search button nor the directory search button is pressed (S2404: No), the mail server 6 determines whether or not a transmission button is pressed (S2406). In the case where the transmission button is pressed, the mail server 6 first determines whether or not an addressee is selected (S2407). The case where an addressee is selected refers to a case where an addressee to communicate with is selected on the screen by using, for example, an input device such as a mouse. More specifically, this means that it is not necessary to transmit a mail to users who are not selected. Thus, in the case where specific users are selected as addressees (S2407: Yes), the mail server 6 excludes users that are not selected from the group of addressees (S2408).

In the case where no specific user is selected as an addressee, the mail server 6 determines whether or not there is any change in the addressees on the display screen (S2409). The case where there is a change in the addressees on the display screen refers to a case where information such as a directory name or the like is changed using, for example, an input device such as a keyboard. In this case, it is necessary to get the communication parameter in accordance with the change in the addressees. Accordingly, the directory information is searched so as to reflect the change on the communication parameter (S2410).

In the case where a specific user is not selected as an addressee or there is no change in the addressees (S2409: No), the communication parameter confirmation process is completed. On the other hand, at S2406 in the present embodiment, in the case where the transmission button is not pressed for a predetermined period of time (S2411: Yes), the communication parameter confirmation process is completed.

As described above, when the communication parameter confirmation process is completed, a communication process is performed (S2211), as seen in the flow chart of FIG. 22. The communication process in this case is to transmit a mail.

Figure 26:
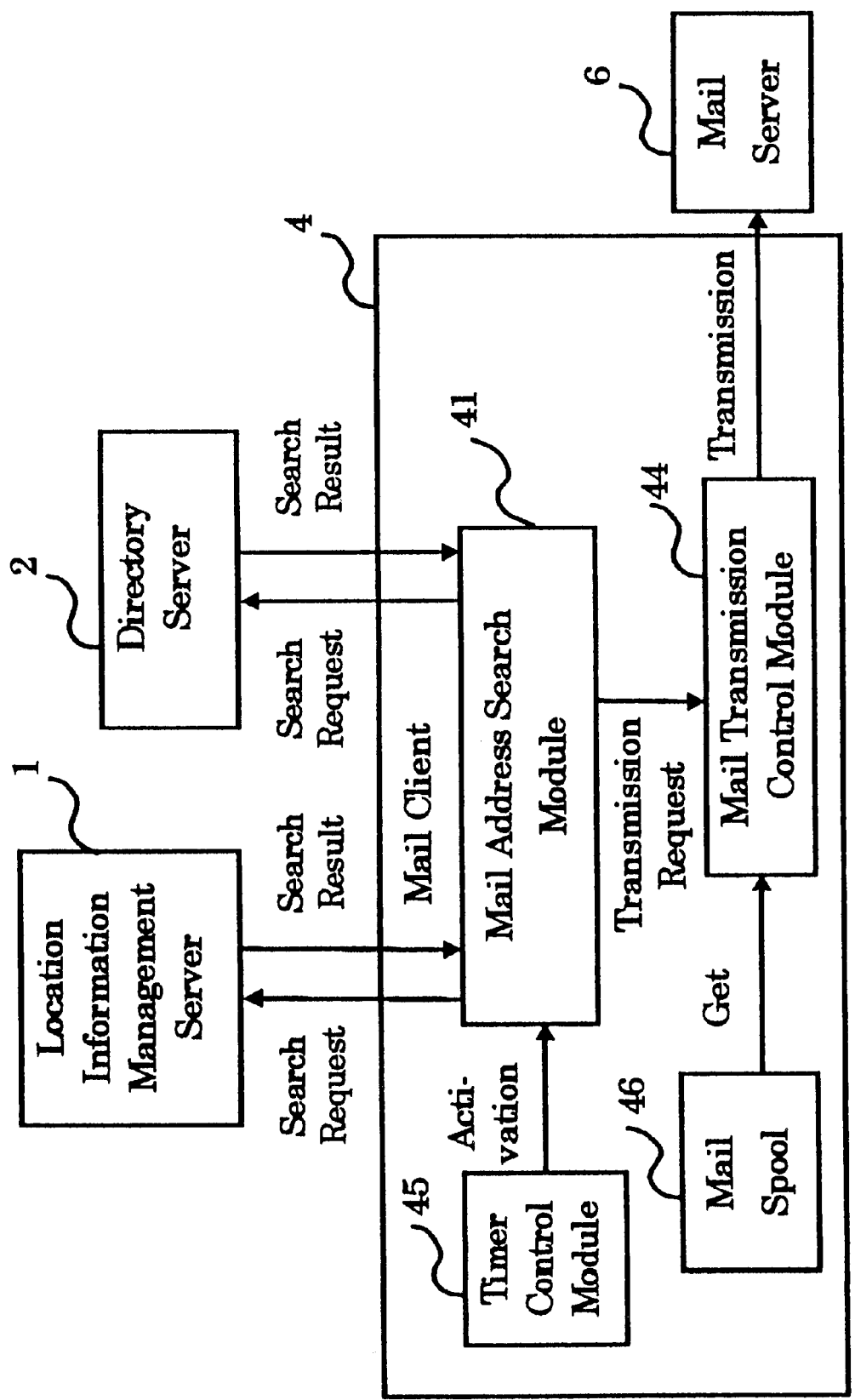
FIG. 26 is a view showing an exemplary module structure of a client in the case where a mail transmission control module is provided in the side of the client.

In the description above, a case where acquisition of the communication parameter, i.e., a mail address, and transmission of a mail are performed by the mail server 6 has been described. However, it is possible for the client 4 to have the function to get the mail address and to transmit the mail, instead of the mail server 6. FIG. 26 shows an exemplary module structure of the client 4 in this case.

The structure shown in FIG. 26 is more effective in the environment where the client 4 is constantly supplied with electric power and the client 4 is constantly connected to the network. With such a structure, provision of interconnection functions between the location information management server 1 and the mail server 6 and between the directory server 2 and the mail server 6 can be eliminated.

Furthermore, the structure shown in FIG. 26 is effective as a remedy in the case where the capacity of the mail server 6 is not sufficient to deal with the frequency of mail transmission with an increased number of clients.

However, in order to perform transmission of a mail at a designated time in accordance with the setting of a communication start time, the client 4 is required to include a timer control module 45 for sensing the communication start time and a mail spool 46 for storing a mail body. A mail transmission control module 44 refers to a transmission control module 423 shown in FIG. 12. In this case, a notice is issued by the mail transmission control module 44 to the mail server 6 so as to transmit a mail.

A detailed description of the procedures of the search process of a mail address and the transmission process of a mail is omitted herein, because those processes are performed in the same manner as described referring to FIGS. 22, 23 and 24, except for where the processes are performed. In this structure, the processes are performed by the client 4 instead of the mail server 6.

Next, as a third embodiment of the present invention, a case where a facsimile is used as communication means will be described. In the case where a facsimile is used as communication means, a facsimile transmission server 7 is added to the structure described referring to FIG. 2, and a facsimile gateway and a modem are connected to the facsimile transmission server 7. Thus, it is possible to perform the communication process in the same manner as using the mail. "A facsimile gateway" refers to a portion where a text or the like input from a user is converted to a format suitable for facsimile transmission.

Figure 27:
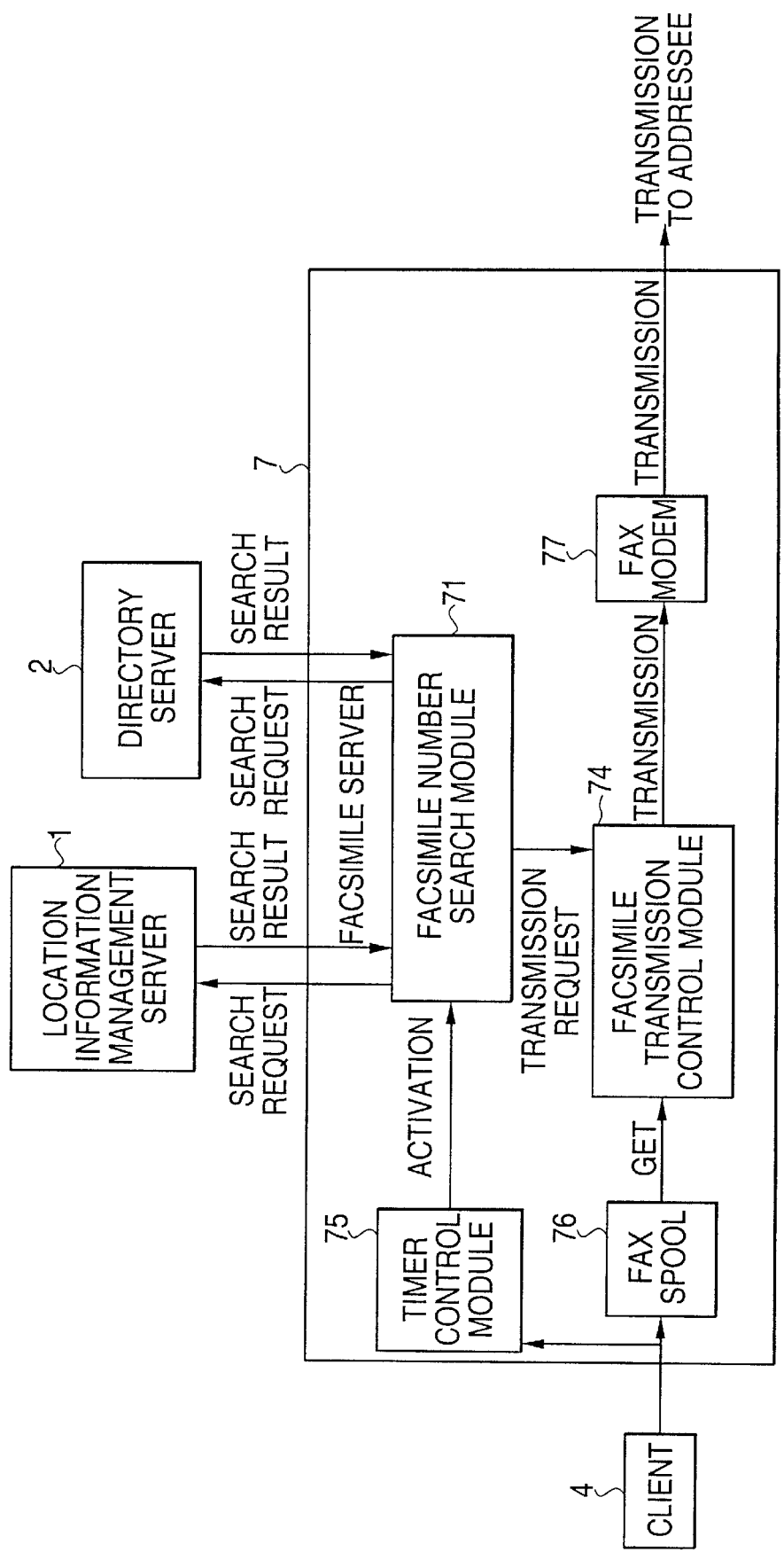
FIG. 27 is a view showing an exemplary module structure of a facsimile transmission server.

FIG. 27 is a view showing an exemplary module structure of the facsimile transmission server 7.

Such a structure where the server is provided with the facsimile modem or the like is effective, in the case where the client 4 does not include a function of modem transmission, or a mobile terminal is used. A detailed description of the search of a facsimile number as the communication parameter and the procedures of facsimile transmission process in this case is omitted herein, because the same method described referring to FIGS. 22, 23 and 24 can be applied to this case.

Furthermore, in the case where the facsimile is used as communication means, as in the case where the mail is used, if the client 4 is provided with a function of performing a facsimile transmission process, the facsimile transmission server 7 can be eliminated.

Figure 28:
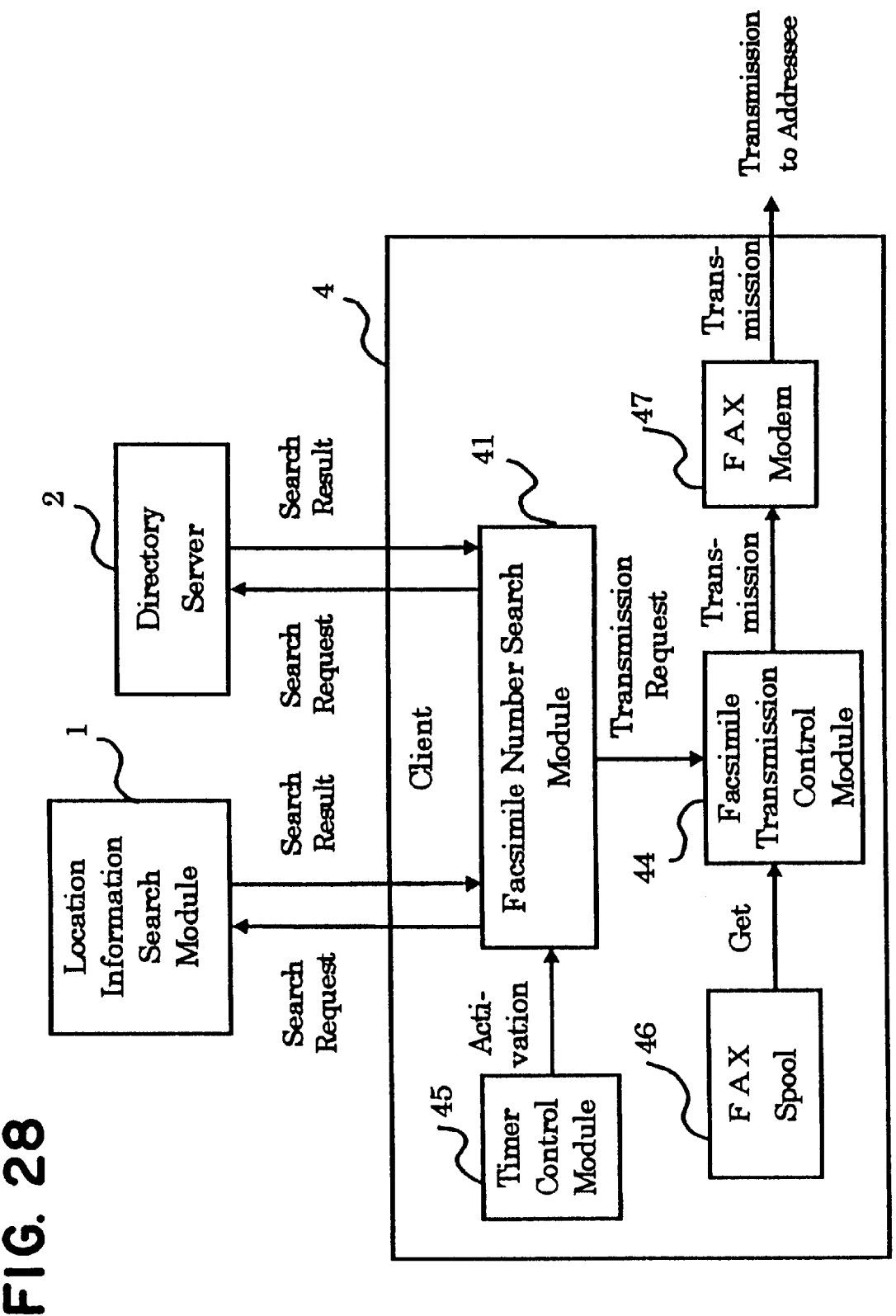
FIG. 28 is a view showing an exemplary module structure of a client in the case where a facsimile transmission function is provided in the side of the client.

FIG. 28 shows an exemplary module structure of the client 4 in the case where the client is provided with a function of performing the facsimile transmission process. Such a structure is useful to distribute processes to the client so as not to concentrate facsimile transmission in the server. A detailed description of the search of a facsimile number and the procedures of facsimile transmission is omitted herein, because they are performed in the same manner described referring to FIGS. 22, 23 and 24.

As for the process procedures described referring to FIGS. 21 through 27, it is possible for the server to perform the mail transmission process and for the client to perform the facsimile transmission process. Conversely, it is possible for the server to perform the facsimile transmission process and for the client to perform the mail transmission process.

Furthermore, it is possible to perform both of the facsimile transmission process and the mail transmission process on the side of the server. Alternatively, it is possible to perform both of the processes on the side of the client.

Either of the structures described above can be applied without affecting the effect of the present invention, i.e., the effect of easily specifying addressees to communicate with and performing a communication process. In the communication support apparatus of the present invention, process efficiency or the like may be changed depending on the environment where the system is implemented, the situation where the system is used or the like. However, a possibility of varying the module structures of the server and the client in many ways means a possibility of dealing with various environments in the case where the communication support apparatus of the present invention is used.

Furthermore, it is possible that a search request to the location information management server 1 is performed by the client, and that a search request to the directory server 2 is performed by the server, and vice versa. Alternatively, it is possible that both of the search request to the location information management server 1 and the search request to the directory server 2 are performed by the client, and that both search requests are performed by the server.

Figure 29:
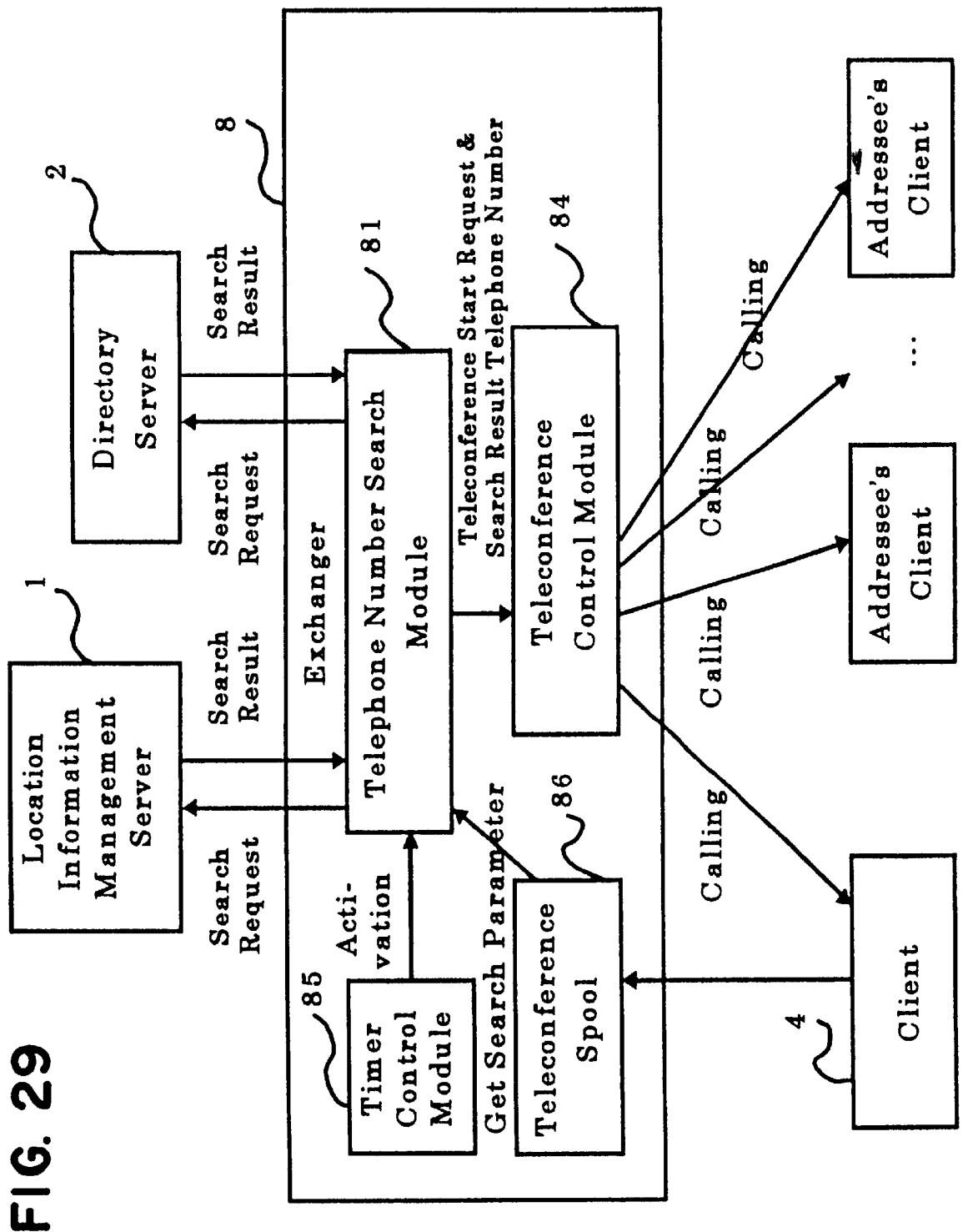
FIG. 29 is a view showing an exemplary module structure in the case where an exchanger is used as a server and a teleconference system employing a plurality of telephone sets is used as communication means.

Furthermore, in the embodiments of the present invention, the case where a mail and a facsimile are used as communication means has been described. However, a telephone set can be used as communication means. One example thereof is a teleconference system in which a calling process is simultaneously performed to a plurality of telephone sets by mixing a plurality of lines. In this case, the present invention can be applied by using an exchanger as the server and making up a module system as shown in FIG. 29. In this case, calls are simultaneously made to a plurality of telephone sets connected as clients at a time when communication is due to start. In this manner, it is possible to open a teleconference using the plurality of telephone sets.

As described above, the communication parameter search apparatus according to the present invention includes location managing means for receiving a signal indicating the location of each user, and for managing the location of each user, input receiving means for receiving an input designating a location from an operator, communication parameter storing means for storing a communication parameter necessary for communication with each user, user search means for referring to information managed by the location managing means and for searching for users present in the location designated by the input received by the input receiving means, communication parameter search means for searching the communication parameter storing means for the communication parameters concerning the users searched for by the user search means. With such features, in the case where, for example, there is a desire of communicating with users present in a designated location, it is possible to specify the users to communicate with without looking into other sources for the communication parameters of users present in the location, and to search easily for the communication parameters concerning the users to communicate with.

Furthermore, the location managing means further includes a location history information storing module for storing history of location information representing location of each of the managed users. The input receiving means further receives an input of a range of time from an operator. The user search means refers to the information stored in the location history information storing module so as to search for users present in the designated location by the input received by the input receiving means in the designated range of time. In this case, it is possible to easily specify users to communicate with by designating a location and a range of time, and to easily search for the communication parameters concerning the users to communicate with.

Furthermore, the communication parameter search apparatus of the present invention further includes schedule input receiving means for receiving an input of schedule from each user, schedule storing means for storing the schedule received by the schedule input receiving means. In the case where the range of time designated by the input received by the input receiving means includes a time after the time when the input is received, the user search means refers to the schedule so as to search for users present in the location designated by the input received by the input receiving means in the designated range of time. With such a structure, as for a time after the time of the input of a range of time, it is possible to easily specify users to communicate with by designating a location and a range of time, and to easily search for the communication parameters concerning the users to communicate with.

Furthermore, the input receiving means further receives an input of a minimum stay period of a user to be searched. The user search means further includes a stay period calculating module for calculating a stay period of the searched user, referring to at least one of the location history information storing module and the schedule storing means. The communication parameter search means searches for the communication parameters for users whose stay period calculated by the stay period calculating module is longer than the minimum stay period received by the input receiving means. With such a structure, it is possible to easily exclude users who stay for only a short period in the location and are not involved in the event in the location from the search object.

Furthermore, the input receiving means further receives an input designating an attribute value of a user to be searched. The communication parameter storing means further stores the attribute value of each user. The communication parameter search means searches for the communication parameter concerning a user having the attribute value designated by the input. With such a structure, a further screening of users from the search object is possible, thus leading to an improved search efficiency.

Furthermore, the communication support apparatus of the present invention includes the communication parameter search apparatus of the present invention and a communication control module for performing communication using the communication parameter searched for by the communication parameter search apparatus. With the communication parameter search apparatus of the present invention, it is possible to actually perform a communication process using the easily searched communication parameter.

The communication support apparatus further includes display means for displaying communication parameters searched by the communication parameter search apparatus, correction input receiving means for receiving an input of correction concerning the communication parameters from operators, and correction means for correcting the communication parameter based on the input received by the correction means. The communication control means performs communication by using the communication parameter corrected by the correction means. Thus, in the case where an addressee searched for by the communication parameter search apparatus of the present invention is not appropriate, it is possible to correct the corresponding information.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A communication parameter search apparatus, comprising:

location managing means for receiving a signal, indicating a location of each user positioned in any place among a plurality of locations, and for managing the location of each user and further comprising location history information storing means for storing a history of location information representing a location of each managed user together with time information;

input receiving means for receiving an input, designating a place, and an input, of a range of time, from an operator;

communication parameter storing means for storing one or more communication parameters necessary for communication with each user;

user group means for grouping users who were present in the same designated place and same range of time received by the input receiving means, by referring to information, stored in the location history information storing means and managed by the location managing means;

communication parameter search means for searching the communication parameter storing means for identifying the communication parameters of the users grouped by the user group means;

a display means for displaying a list of selectable communication parameters corresponding to a name of each grouped user who were present at the same designated place during the same designated range of time; and communication means for communicating with the grouped users using their corresponding selected communication parameters.

2. The communication parameter search apparatus according to claim 1, further comprising:

schedule input receiving means for receiving an input of a schedule from each user; and schedule storing means for storing a schedule received by the schedule input receiving means, wherein, if a range of time designated by an input received by the input receiving means includes a time after the time of reception of the input, the user search means refers to the schedule so as to search for users present in a location designated by the input received by the input receiving means in the designated range of time.

3. The communication parameter search apparatus according to claim 2, wherein:

the input receiving means further receives an input of a minimum stay period of users to be searched for from an operator;

the user search means further comprises stay period calculating means for calculating a stay period of searched users, referring to the location history information storing means and the schedule storing means; and the communication parameter search means searches for communication parameters concerning users whose stay period calculated by the stay period calculating means is longer than the minimum stay period received by the input receiving means.

4. The communication parameter search apparatus according to claim 3, further comprising:

communication control means for performing communication using communication parameters searched for by the communication parameter search apparatus.

5. The communication parameter search apparatus according to claim 4, further comprising:

display means for displaying an addressee searched for by the communication parameter search apparatus;

correction input receiving means for receiving an input of correction concerning the addressee from an operator; and correction means for correcting communication parameters for performing communication based on the input received by the correction input receiving means, wherein the communication control means performs communication using the communication parameters corrected by the correction means.

6. The communication parameter search apparatus according to claim 2, wherein:

the input receiving means further receives an input designating an attribute value of users to be searched for;

the communication parameter storing means further stores the attribute value of each user; and the communication parameter search means searches for communication parameters concerning users having the attribute value designated by the input.

7. The communication parameter search apparatus according to claim 6, further comprising:

communication control means for performing communication using communication parameters searched for by the communication parameter search apparatus.

8. The communication search apparatus according to claim 7, further comprising:

display means for displaying an addressee searched for by the communication parameter search apparatus;

correction input receiving means for receiving an input of correction concerning the addressee from an operator; and correction means for correcting communication parameters for performing communication based on the input received by the correction input receiving means, wherein the communication control means performs communication using the communication parameters corrected by the correction means.

9. The communication parameter search apparatus according to claim 2, further comprising:

communication control means for performing communication using communication parameters searched for by the communication parameter search apparatus.

10. The communication parameter search apparatus according to claim 9, further comprising:

display means for displaying an addressee searched for by the communication parameter search apparatus;

correction input receiving means for receiving an input of correction concerning the addressee from an operator; and correction means for correcting the communication parameters for performing communication based on the input received by the correction input receiving means, wherein the communication control means performs communication using the communication parameters corrected by the correction means.

11. The communication parameter search apparatus according to claim 1, wherein:

the input receiving means further receives an input of a minimum stay period of users to be searched for from an operator;

the user search means further comprises stay period calculating means for calculating stay period of searched users, referring to the location history information storing means and the schedule storing means; and the communication parameter search means searches for communication parameters concerning users whose stay period calculated by the stay period calculating means is longer than the minimum stay period received by the input receiving means.

12. The communication parameter search apparatus according to claim 11, wherein:

the input receiving means further receives an input designating an attribute value of users to be searched for;

the communication parameter storing means further stores the attribute value of each user; and the communication parameter search means searches for communication parameters for users having the attribute value designated by the input.

13. The communication parameter search apparatus according to claim 12, further comprising:

communication control means for performing communication using communication parameters searched for by the communication parameter search apparatus.

14. The communication parameter search apparatus according to claim 13, further comprising:

display means for displaying an addressee searched for by the communication parameter search apparatus;

correction input receiving means for receiving an input of correction concerning the addressee from an operator; and correction means for correcting communication parameters based on the input received by the correction input receiving means, wherein the communication control means performs communication using the communication parameters corrected by the correction means.

15. The communication parameter search apparatus according to claim 11, further comprising:

communication control means for performing communication using communication parameters searched for by the communication parameter search apparatus.

16. The communication parameter search apparatus according to claim 15, further comprising:

display means for displaying an addressee searched for by the communication parameter search apparatus;

correction input receiving means for receiving an input of correction concerning the addressee from an operator; and correction means for correcting communication parameters for performing communication based on the input received by the correction input receiving means, wherein the communication control means performs communication using the communication parameters corrected by the correction means.

17. The communication parameter search apparatus according to claim 1, wherein:

the input receiving means further receives an input designating an attribute value of users to be searched for;

the communication parameter storing means further stores the attribute value of each user; and the communication parameter search means searches for communication parameters concerning users having the attribute value designated by the input.

18. The communication parameter search apparatus according to claim 17, further comprising:

communication control means for performing communication using communication parameters searched for by the communication parameter search apparatus.

19. The communication parameter search apparatus according to claim 18, further comprising:

display means for displaying an addressee searched for by the communication parameter search apparatus;

correction input receiving means for receiving an input of correction concerning the addressee from an operator; and correction means for correcting communication parameters based on the input received by the correction input receiving means, wherein the communication control means performs communication using the communication parameters corrected by the correction means.

20. The communication parameter search apparatus according to claim 1, further comprising:

communication control means for performing communication using communication parameters searched for by the communication parameter search apparatus.

21. The communication parameter search apparatus according to claims 20, further comprising:

display means for displaying an addressee searched for by the communication parameter search apparatus;

correction input receiving means for receiving an input of correction concerning the addressee from an operator; and correction means for correcting communication parameters for performing communication based on the input received by the correction input receiving means, wherein the communication control means performs communication using the communication parameters corrected by the correction means.

22. The communication parameter search apparatus according to claim 1, further comprising:

communication control means for performing communication using communication parameters searched for by the communication parameter search apparatus;

display means for displaying an addressee searched for by the communication parameter search apparatus;

correction input receiving means for receiving an input of correction concerning the addressee from an operator; and correction means for correcting communication parameters for performing communication based on the input received by the correction input receiving means, wherein the communication control means performs communication using the communication parameters corrected by the correction means.

23. A method for electronically transmitting a message to persons who were in attendance at a particular meeting, after the meeting, said method comprising the steps of:

grouping the persons who were in attendance at the particular meeting based on previously stored information regarding the time of the meeting, previously stored information regarding the place of the meeting and trace information of the location regarding the moving of each person;

searching previously registered addresses for current addresses of the grouped persons at the time of transmitting the message; and transmitting automatically an electronic message to the addresses searched in the searching step.

24. A communication parameter search method, comprising:

receiving a signal indicating a location of each user positioned in any place among a plurality of locations;

managing the location of each user in accordance with the received signal and with location history information of each managed user together with time information;

receiving an input designating a place and a range of time;

storing one or more communication parameters necessary for communication with each user;

grouping managed users who were present in the same designated place and same range of time by referring to stored location history information for managed users;

searching the stored communication parameters to identify communication parameters of the grouped users;

displaying a list of selectable identified communication parameters corresponding to a name of each grouped user who was present at the same designated place during the same designated range of time; and communicating with the grouped users using their corresponding selected communication parameters.

25. The communication parameter search method according to claim 24, further comprising:

receiving and storing an input of a schedule from each managed user; and if the range of time designated by the input includes a time after the time of reception of the input, referring to the stored schedule of the user so as to search for the user indicated to be in the location designated by the input, in the designated range of time.

26. The communication parameter search method according to claim 25, further comprising:

receiving an input of a minimum stay period of users to be searched for;

calculating a stay period of searched users, referring to at least one of the stored location history information and the stored schedules of the managed users; and searching for communication parameters concerning managed users whose calculated stay period is longer than the minimum stay period of the received input.

27. A method as recited in claim 24, further comprising:

performing communications using communication parameters uncovered by searching the stored communication parameters;

displaying an addressee obtained by searching the stored communication parameters;

receiving an input of a correction concerning the addressee;

correcting the stored communication parameters for performing a communication, based on the correction input; and performing a communication using the corrected communication parameters.

28. A memory medium storing a program for controlling a computer to perform a communication parameter search, by:

receiving an input designating a place and a range of time;

storing one or more communication parameters necessary for communication with each of a plurality of users;

grouping managed users who were present in the same designated place and same range of time by referring to stored location history information for managed users;

searching the stored communication parameters to identify communication parameters of the grouped users;

displaying a list of selectable communication parameters corresponding to a name of each grouped user who was present at the same designated place during the same designated range of time; and communicating with the grouped users using their corresponding selected communication parameters.

29. The memory medium storing a program according to claim 28, further comprising:

receiving and storing an input of a schedule from each managed user; and if the range of time designated by the input includes a time after the time of reception of the input, referring to the stored schedule of the user so as to search for the user indicated to be in the location designated by the input, in the designated range of time.

30. The memory medium storing a program according to claim 29, further comprising:

receiving an input of a minimum stay period of users to be searched for;

calculating a stay period of searched users, referring to at least one of the stored location history information and the stored schedule; and searching for communication parameters concerning users whose calculated stay period is longer than the minimum stay period of the received input.

31. A communication parameter search apparatus, comprising:

a location managing unit receiving a signal, indicating a location of each user positioned in any place among a plurality of locations, and managing the location of each user and further comprising a location history information memory storing a history of location information representing a location of each managed user together with time information;

an input receiving unit receiving an input, designating a place, and an input, of a range of time, from an operator;

a communication parameter memory storing one or more communication parameters necessary for communication with each user;

a user grouping unit for grouping users who were present in the same designated place and same range of time received by the input receiving unit, by referring to information stored in the location history information memory and managed by the location managing unit;

a communication parameter search unit searching the communication parameter memory to identify communication parameters of the users grouped by the user grouping unit;

a display unit for displaying a list of selectable communication parameters corresponding to a name of each user who was present at the same designated place during the same designated range of time; and a communications unit for communicating with the grouped users using their corresponding selected communication parameters.

32. The communication parameter search apparatus according to claim 31, further comprising:

a schedule input receiving unit receiving an input of a schedule from each user; and a schedule memory storing a schedule received by the schedule input receiving unit, wherein, if a range of time designated by an input received by the input receiving unit includes a time after the time of reception of the input, the user search unit refers to the schedule so as to search for users present in a location designated by the input received by the input receiving unit in the designated range of time.

33. The communication parameter search apparatus according to claim 32, wherein:

the input receiving unit further receives an input of a minimum stay period of users to be searched for from an operator;

the user search unit further comprises a stay period calculating unit calculating a stay period of searched users, referring to at least one of the location history information memory and the schedule memory; and the communication parameter search unit searches for communication parameters concerning users whose stay period calculated by the stay period calculating unit is longer than the minimum stay period received by the input receiving unit.

34. The communication parameter search apparatus according to claim 33, further comprising:

a communication control unit performing communication using communication parameters searched for by the communication parameter search apparatus.

35. A method of automatically communicating with groups of people, comprising:

inputting the location and a range of time;

determining, when the range includes a past time, a first group of people, whose members were present at the location during the time, by searching a location history database;

determining, when the range includes a past time, a second group of people, whose members are currently present at the location during the time, by searching the location history database and a schedule database;

determining a third group of people, when the range includes a future time, whose members are scheduled to be present at the location during the time, by searching the schedule database;

determining, for each member of each group, a communication method and address corresponding to the member and the method, by searching a directory; and communicating a message to each member of each group by using the communication and address corresponding to each member.

36. The method according to claim 35, further comprising designating a stay duration, and wherein said determining the first group further comprises eliminating from the first group members that were not at the location for longer than the stay duration, wherein said determining the second group further comprises eliminating from the second group members that were not at and will not be at the location for the minimum stay duration, and wherein said determining the third group further comprises eliminating from the third group members that are not scheduled to be at the location for longer than the stay duration.

\* \* \* \* \*